(12) United States Patent
Bender et al.

(10) Patent No.: US 7,633,897 B2
(45) Date of Patent: Dec. 15, 2009

(54) METHOD AND APPARATUS FOR THE DISCOVERY OF RADIO ACCESS NETWORK ELEMENTS AND EXCHANGE OF CAPABILITY AND DATA ATTRIBUTES BETWEEN THOSE ELEMENTS

(75) Inventors: Paul E. Bender, San Diego, CA (US); Noam A. Ziv, San Diego, CA (US); Vito Bica, Poway, CA (US); Rahul Anand, San Diego, CA (US); Sreekanth Vietla, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 632 days.

(21) Appl. No.: 11/346,978

(22) Filed: Feb. 3, 2006

(65) Prior Publication Data

US 2007/0183357 A1 Aug. 9, 2007

(51) Int. Cl.
*H04W 4/00* (2006.01)

(52) U.S. Cl. .................. 370/328; 370/338; 370/310

(58) Field of Classification Search ......... 370/254–255, 370/310, 328, 331–332, 338, 345, 352, 400, 370/410, 422; 455/403, 422.1, 418–420, 455/428, 432.1–435.3, 550.1, 560–561; 709/228, 709/238

See application file for complete search history.

(56) References Cited

U.S. PATENT DOCUMENTS

| 6,850,494 | B1 * | 2/2005 | Bender ............... 370/254 |
| 2005/0089011 | A1 * | 4/2005 | Bender ............... 370/349 |
| 2006/0187858 | A1 * | 8/2006 | Kenichi et al. ........ 370/254 |

* cited by examiner

*Primary Examiner*—Kamran Afshar
(74) *Attorney, Agent, or Firm*—Larry J. Moskowitz; Kam T Tam

(57) ABSTRACT

The present apparatus comprises a radio access network element having at least one processor, and at least one memory operably connected to the at least one processor, whereby the radio access network element is adapted to execute instructions stored in the memory comprising discovery of at least one other element in a radio access network. The radio access element further comprises instructions for removal or addition of network elements, instructions for determining a paging area and instructions for forwarding messages from a mobile to a controller in another domain.

49 Claims, 14 Drawing Sheets

METHOD AND APPARATUS FOR THE DISCOVERY OF RADIO ACCESS NETWORK ELEMENTS AND EXCHANGE OF CAPABILITY AND DATA ATTRIBUTES BETWEEN THOSE ELEMENTS

BACKGROUND OF THE INVENTION

1. Field

The present invention pertains generally to wireless radio access networks, and more specifically, to discovery between network elements.

2. Background

The present patent application comprises an apparatus and method for detecting the presence of other elements in the network and determining the supported protocols/data on that detected element.

SUMMARY OF THE INVENTION

In view of the above, the described features of the present invention generally relate to one or more improved systems, methods and/or apparatuses for communicating speech, data, and both speech and data.

In one embodiment, the present apparatus comprises a radio access network element having at least one processor, and at least one memory operably connected to the at least one processor, whereby the radio access network element is adapted to execute instructions stored in the memory comprising discovery of at least one other element in a radio access network.

In another embodiment, the radio access element further comprises instructions for removal or addition of network elements, instructions for determining a paging area and instructions for forwarding messages from a mobile to a controller in another domain.

In another embodiment, the instructions for removal or addition of network elements comprise instructions for telling neighboring elements to add at least one new element to their neighbor list and discovering information about the added element.

In another embodiment, the instructions for determining a paging area comprise using a neighbor list of at least one element to discover other elements and recursively building a paging area centered at said at least one element.

In another embodiment, the instructions for discovery of at least one other element in the radio access network comprise sending a message to an address, establishing a discovery session with the at least one other element, determining data and protocols supported by the at least one other element, retrieving the data, and using the supported protocol.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION

Figure 1:
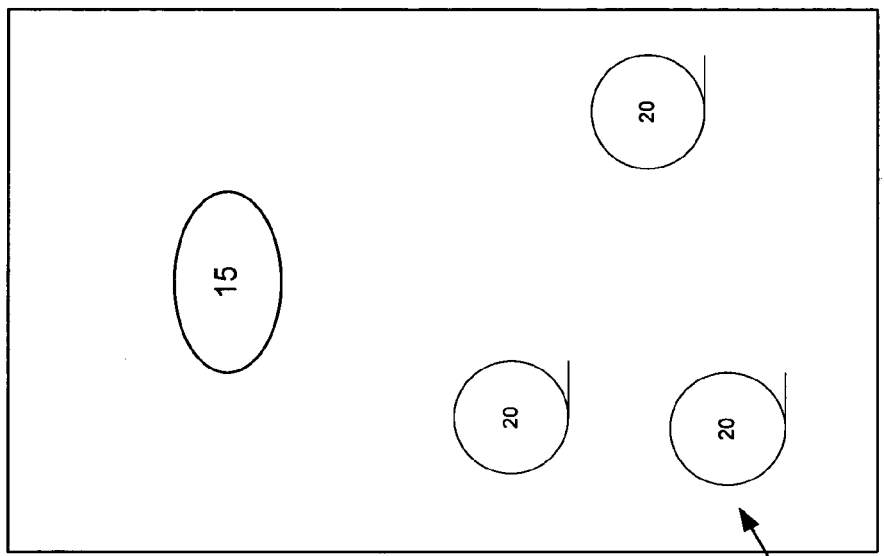
FIG. 1 is a typical radio access network.
Figure 1:
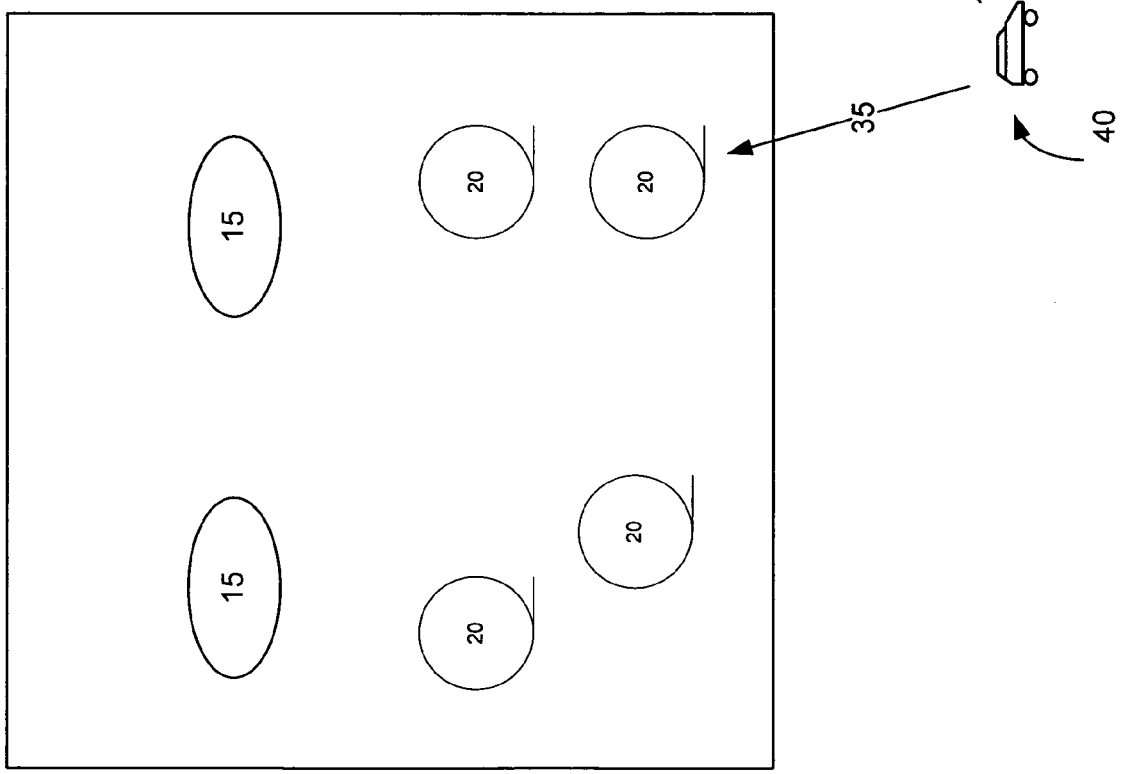

The word "illustrative" is used herein to mean "serving as an example, instance, or illustration." Any embodiment described herein as "illustrative" is not necessarily to be construed as preferred or advantageous over other embodiments.

The apparatus and method disclosed in this patent application enables a "discoverer" radio access network element 10 to detect the presence of other elements 10. Once detected, the discovered element 10 can be queried to determine the capabilities and data attributes it supports and/or requests from a discoverer to enable it to provide services to a mobile terminal 40 that seeks to use the network 5. The present method and apparatus may also be used to retrieve the values of the data attributes supported by the discovered element 10. Detection mechanisms are provided such that elements 10 within administratively-scoped domains can find each other during normal network initialization and configuration, prior to a mobile terminal's 40 request for service.

Additional mechanisms are defined that enable a "requester" network element 10 that requests service from another "provider" network element 10 to include the information which allows the provider to discover the requester, even when the requester and provider are in different administratively-scoped domains. This enables the ability to efficiently provide service to mobile terminals 40 as they migrate between radio access networks (RAN) 5 in different domains.

In one embodiment, the present patent application discloses a discovery method and apparatus used in a RAN 5 realization of cdma2000 1×EV-DO systems. When referring to RAN systems throughout the specification, the present invention applies to any code division multiple access (CDMA) based system (including WCDMA), any orthogonal frequency-division multiplexing (OFDM) based system and any ultra wideband (UWB) system. The method is separated into two parts: system architecture and discovery entity (DA/DS) design. The system architecture describes the different inter-element discovery embodiments, and the selection of specific discovery protocols to be used in each embodiment. The entity design discloses the steps executed with respect to discovery agent (DA) 22 services and discovery server (DS) 24 services protocols. These steps detail how operations made by a non-discovery protocol invoking the DA/DS interfaces are mapped to the discovery protocols.

Wireless radio access networks (WRAN) 5 are composed of a number of network elements 10 of one or more types. In one embodiment, the WRAN 5 is a wideband code division multiple access (W-CDMA) RAN. In general, the network consists of two types of elements 10. The first type of element 10 is connected to the Internet. Different wireless technologies use various names for this element 10 such as a controller 15, a base station controller (BSC), a radio network controller (RNC), or a modem pool controllers (MPC). The second type of element 10 transmits and receives radio waves. Different wireless technologies use various names for this element 10 such as a transceiver 20, an access point, a radio base station (RBS), or a modem pool transceivers (MPT). The network elements 10 are typically designed to work with specific types of other elements 10 that support specific versions of interfaces used to exchange messages and data. Furthermore, they are typically configured to communicate only with specific other elements 10 within a given administratively scoped domain.

One skilled in the art may recognize that in some embodiments the controller 15 and transceiver 20 may reside in the same physical unit or box.

Discovery is the process by which RAN elements 10 detect the presence of other elements 10 in the network 5 and determine the supported protocols/data on that element 10. Discovery protocols also provide mechanisms for elements 10 to retrieve data from other elements 10 and/or register for data change notifications. The discovery disclosed in the present patent application applies to the elements 10 of the network 5, i.e., the transceivers 20 and the controllers 15.

For WRANs 5, discovery is intended for use between any two nodes, or network elements 10 in the network 5, e.g. MPC 15 discovering other MPC's 15, MPT's 20 discovering other MPT's 20, MPT's 20 discovering MPC's 15 and MPC's 15 discovering MPT's 20. To the mobile 40, it is a seamless process. Thus, the present patent application defines a method and apparatus which enables the definition of administratively defined domains containing elements 10 that can offer services to each other in order to establish a functional radio access network 5.

The following is a list of definitions of terms used in the current patent application.

Discovery Server (DS) 24: The entity on a RAN element 10 that hosts group membership protocol publisher 26 and RAN discovery session protocol (DSP) server 30 functions.

Discovery Agent (DA) 22: The entity on a RAN element 10 that hosts GMP subscriber 28 and DSP client 32 functions.

Capability: An identifier for the subset of a protocol's functionality that is observable by another RAN element 10. An element 10 lists its capabilities in its capability list (or CapabilityList).

GMP Publisher 26: A component that accomplishes the publisher 26 role of the GMP protocol. It serves to announce the presence of the element 10 and provide other information needed by the subscriber 28 to set up a DSP session. A publisher 26 may be either active or passive.

GMP Subscriber 28: A component that accomplishes the subscriber 28 role of the GMP protocol. It listens for announcements from publishers 26 and tracks changes in their capabilities. It may also send solicitations for publishers 26 to announce themselves. A subscriber 28 may be either passive or active.

DSP Server 30: A component of the DSP protocol that accepts client 32 requests for the establishment of discovery sessions. After the session is established; it responds to client 32 queries for element 10 data and capability list.

DSP Client 32: A component of the DSP protocol that establishes discovery sessions with DSP servers 30 and queries for a capability list and/or element 10 data.

Usable: An element 10 considers another element 10 usable if the other element 10 supports a set of capabilities (or Capabilities) that can be utilized by it.

CapabilityListSignature: A value calculated by the CapListManager protocol that uniquely identifies the contents of the capability list (or CapabilityList).

A typical radio access network 5 is illustrated in FIG. 1. It is comprised of one or more groups of controllers 15 (Group A and Group B). Controllers 15 are primary controllers for one or more transceivers 20. Control of the communication link 35 between the mobile 40 and the transceivers 20 will be handed off as the mobile 40 moves from the coverage area of one transceiver 20 into the coverage area of the next transceiver 20. Likewise, as the mobile 40 moves, it will leave the coverage area of a group of transceivers 20 controlled by a first controller 15 and enter another coverage area of a second group of transceivers 20 controlled by a second controller 15.

Current day radio access networks 5 are centrally controlled by a network management platform (NMP). Because of this central management, the resultant prior art network 5 has a number of problems:

Removal and Addition of Network Elements 10

Removal or addition of network elements 10 may cause configuration updates to some or all of the other elements 10 within the domain. In a centrally managed system, these changes may be performed by a third entity, typically a network management platform, which is responsible for the administration and maintenance of the network 5. Using a third entity decreases the robustness and reliability of the overall network 5 since if the third entity fails, the entire network 5 is affected. Furthermore, the network management platform becomes a potential bottleneck, since it must contact and update all elements 10 affected by any changes as a result of a change to a single element 10.

For example, when a new transceiver 20 is added in a centrally managed system, the network management platform informs the neighboring transceivers 20 of the new transceiver 20 and its configuration such as what the new transceiver's 20 PN offset is.

Thus, the network management platform loads the new transceiver 20 with the information used to operate in the network 5 and also gives the same information to the currently existing transceivers 20.

In the present method and apparatus, the new transceiver 20 is loaded with its configuration information. The network management platform tells the neighboring transceivers 20 to add the new transceiver 20 to their neighbor list. Any information about the new transceiver 20 used by the neighboring transceivers 20 can be discovered by the neighboring transceivers 20 through the use of discovery protocols, such as a GMP, a targeted discovery protocol (TDP) and a DSP, all of which are part of the RAN 5 discovery protocol family. The neighboring transceiver 20 communicates directly with the new transceiver 20 to obtain data and capability information to add the new transceiver 20 to the network. Rather than network management supplying the PN offset data to the new transceiver's 20 neighbors, those neighbors obtain it directly from the new transceiver 20.

Upon detection by a discoverer, the RAN discovery protocol enables the discoverer to choose from a list of "discovery relationship" protocols supported by the discovered element 10. It also enables the discoverer to use the chosen protocol to establish a discovery relationship with the discovered element 10. Furthermore, the RAN discovery protocol enables a discoverer element 10 which has received a request from another element 10, and for which no discovery relationship already exists, to establish such a relationship regardless of whether the requestor and discoverer reside in a common administratively scoped domain.

RAN Group Membership Protocol

The GMP subtypes provide a way for elements 10 to detect the presence/absence of other elements 10. The targeted discovery protocol allows setting up of one-to-one discovery relationships. GMP is used by the network elements 10 to detect each other and to learn what specific discovery protocols are supported. It is used to detect when elements 10 enter and leave the network 5 and to provide enough information so that a discovery session can be provided to those elements 10. Thus, it enables a "discoverer" element 10 in an administratively scoped domain to detect the addition or removal of other elements 10 to that domain without the intervention of a third party.

GMP is a base-type protocol that specifies a common set of group membership operations/primitives, and allows multiple protocol subtypes which can be implemented using the appropriate network technology. The technology-specific protocols (the subtypes of the base-type protocol) implement the common group membership primitives and use them to interact with other protocols within the element 10 (analogous to a base-class interface) whereas they use technology-specific messages to advertise their presence to other elements 10 and other communication.

As an example, a subscriber implementation of a multicast based subtype of GMP uses IP-based multicast to send/receive Solicit/Advertise messages to/from other elements 10 and implements the GMP standard primitives. Similarly, session initiation protocol (SIP) presence server based detection of elements 10 can be accomplished in the RAN by defining a SIP-based subtype of the GMP protocol. Such a protocol subtype would use SIP messages to communicate with the SIP presence server and it would use the GMP standard primitives to interact with other RAN 5 protocols on the element 10. Similarly, a common object request broker architecture (COBRA) based detection of elements 10 can be accomplished by defining a CORBA based subtype of the GMP protocol. Such a CORBA based subtype would use a CORBA protocol to communicate with each other. Other discovery group formation technologies can be similarly adapted to RAN 5, without changing other RAN 5 protocols.

RAN Discovery Session Protocol (DSP)

DSP uses the data provided by the GMP and TDP protocols and provide mechanisms to determine supported protocols/data and to retrieve data or register for data change notifications. DSP is used by the network elements 10 to exchange discovery data and status. It defines an umbrella of protocols that can query what capabilities and data a discovered element 10 has. Thus, the discovery relationship described by this method and apparatus enables a discoverer 10 to directly query a discovered element 10 regarding the capabilities and data attributes the discovered element 10 supports and/or uses. Such attributes include neighbor lists sent from a transceiver 20 to a controller 15, configuration information such as a neighboring transceiver's 20 PN offset, and what protocol versions are supported. (For instance, two different transceivers 20 may support different reverse-traffic channel MAC protocol subtypes). A discovered element 10 may indicate that it supports multiple versions of data and/or capabilities, allowing a wide range of discoverer elements 10 to interact with it. This allows the elements 10 in a system to adapt quickly to configuration or operational changes to the system, thus removing the need for a centralized management system to distribute this data across multiple elements 10, eliminating synchronization and performance bottlenecks. It also enables a discoverer 10 to request and receive notification from a discovered element 10 when data attributes of interest on the discovered element 10 change and to determine the nature of the changes. This can be used to support an organized rollout of upgraded functionality to network elements 10 with minimum or no downtime. Therefore, this improved method and apparatus eliminates a single point of failure (if the network management platform fails the system can not be reconfigured), or a potential bottleneck (as the network management platform provides information to all the transceivers 20, in getting information about the new transceiver 20 to the existing transceivers 20).

Transceiver 20 NeighborList Discovery

As stated above, in a 1×EV-DO based RAN 5, a transceiver 20 transmits information about neighboring channels and the access network 5 over the air to the access terminals 40 using overhead messages. Rather than configuring the information about each neighboring transceiver 20 in each transceiver 20, the RAN 5 discovery protocols can be used to gather the information from the neighboring transceivers 20. Each transceiver 20 is configured with sufficient information about neighboring transceivers 20 (eg. element identifiers (or ElementIds) and/or addresses) and the overhead message information like pilot pseudo-random (PN) offsets, channel numbers, etc. is gathered from the neighboring transceivers 20 using discovery protocols.

In one embodiment, the transceivers 20 use the TDP to detect the presence of neighboring transceivers 20 followed by using the DSP to establish discovery sessions with them 20. After establishing a session, the DSP protocol is used to gather additional information like channel numbers from the neighboring transceivers 20 and is transmitted to the terminals 40 in overhead messages.

This interaction is illustrated in the following call flow shown in FIG. 2. The transceiver.2 (20) is a neighbor of transceiver.1 (20). transceiver.1 (20) is provisioned with a NeighborList that includes the ElementId of transceiver.2 (20). The 'NeighborList Manager' 50 shown in the figure is a logical entity that is responsible for gathering information from neighboring transceivers 20 and broadcasting it in overhead messages.

The following conventions are used in the call flows:

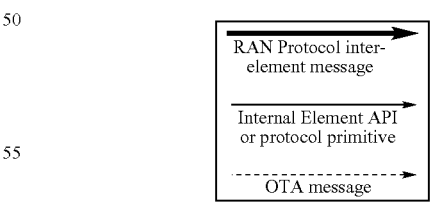

RAN 5 protocol inter-element messages depicted in the diagrams in the following subsections use the following convention:

<ProtocolName>:<MessageName>(<SignificantArguments>), where ProtocolName is the name of the protocol that defines the message, MessageName is the name of the message, and SignificantArguments is a list of one or more comma separated data items that are conveyed by the message.

Figure 2:
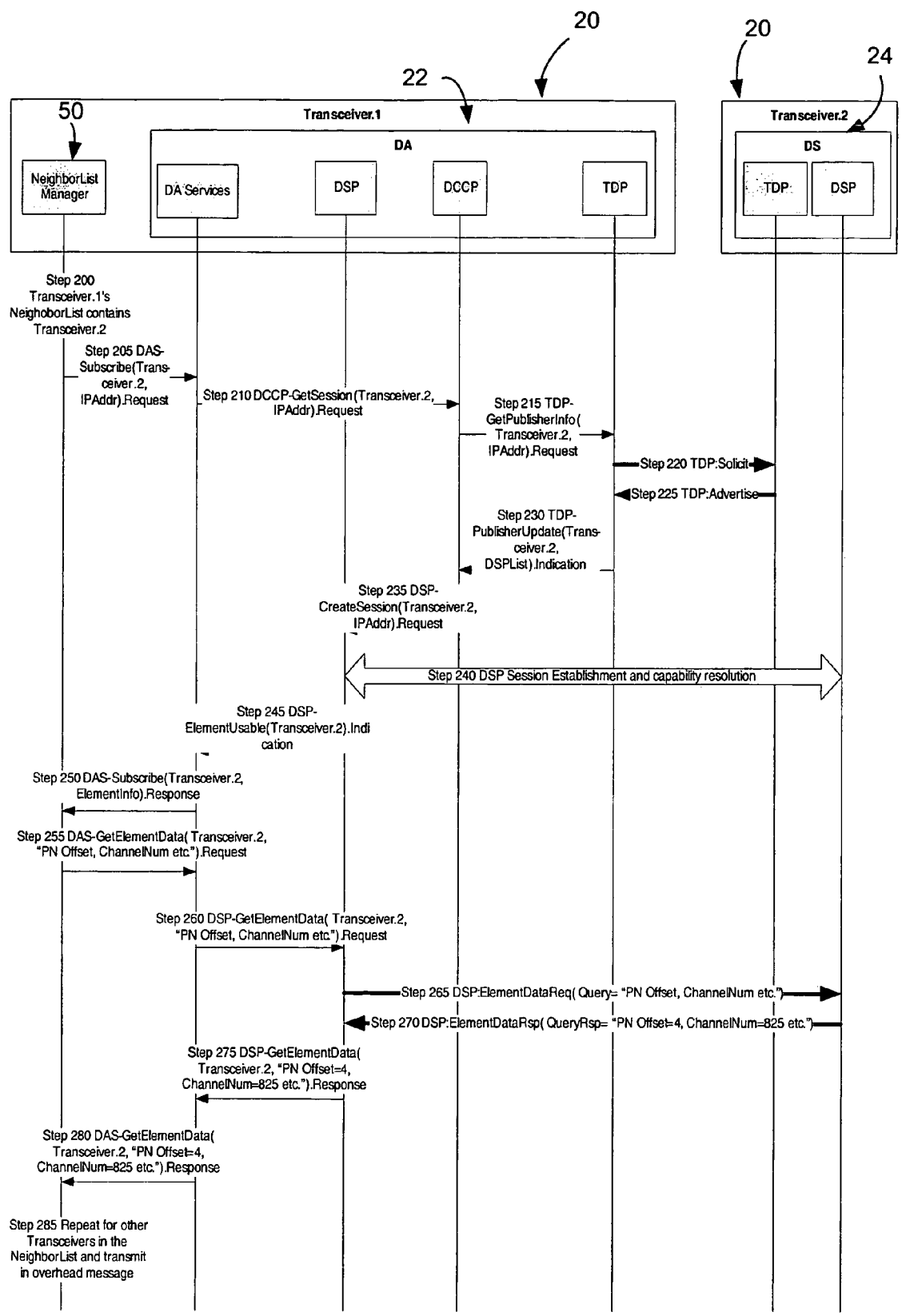
FIG. 2 illustrates the call flow executed when executing a NeighborList discovery.

The following steps are executed in the call flow shown in FIG. 2:

Step 200—transceiver.1 (20) is configured with a NeighborList that includes the ElementId for transceiver.2 (20).

Step 205—The NeighborList Manager 50 expresses its interest in transceiver.2 (20) by sending a subscription request to the DA 22.

Step 210—The DA Services checks to see if it has a session with transceiver.2 (20). In this case it does not have a session and requests a discovery client creator protocol (DCCP) to create a session with transceiver.2 (20).

Step 215—The DCCP requests TDP to retrieve the publisher information, i.e., PublisherInfo (CapabilityListSignature and DSPList) for transceivers (20).

Step 220—The TDP of transceiver. 1(20) sends one or more solicit (or Solicit) messages to the DS 22 of transceiver.2 (20).

Step 225—The TDP of transceiver.2 (20) receives the above solicit message and responds with an Advertise message that contains the PublisherInfo.

Step 230—The TDP of transceiver. (20) receives the advertise (or Advertise) message and issues a publisher update indication (TDP-PublisherUpdate.Indication) that includes the PublisherInfo of transceiver.2 (20).

Step 235—The DCCP receives the TDP-PublisherUpdate.Indication, extracts the DSPList from the indication, chooses a DSP protocol (in this case DSP) and requests the creation of a discovery session.

Step 240—The DSP of transceiver.1 (20) establishes a session with transceiver.2 (20), resolves the capabilities of transceiver.2 (20) and finds it to be usable.

Step 245—The DSP issues an element usable indication (or, DSP-ElementUsable.Indication) notifying that a new usable element 10 is detected.

Step 250—The DA Services receives the DSP-ElementUsable.Indication and informs the neighbor list manager (NeighborList Manager) 50 that the subscription to transceiver.2 (20) has succeeded. (Note that the generic behavior of DA Services will also cause it to send a usable element found (or DAS-UsableElementFound.Indication) primitive. That event is not shown in this flow).

Step 255—The NeighborList Manager 50 on transceivers (20) requests the DA 22 to retrieve element data like channel information etc. from transceiver.2 (20).

Step 260—The DA Services requests the DSP to retrieve the above element data.

Step 265—The DSP sends an ElementDataReq to transceiver.2 (20).

Step 270—The DSP on transceiver.2 (20) responds with the element data.

Step 275—The DSP provides the element data to the DA Services.

Step 280—The DA Services forwards the element data to the NeighborList Manager 50.

Step 285—The NeighborList Manager 50 repeats the above steps for all transceivers 20 in its NeighborList and sends the information to access terminals 40 in overhead messages.

Software Upgrades

Another problem found in centrally managed networks 5 is that it may be difficult to upgrade elements 10. Software upgrades typically need to be performed simultaneously, synchronized across an entire domain, causing a system outage for some period of time. To upgrade its software, the transceiver 20 is typically taken offline by the network management platform. In addition, the other transceivers 20 are typically taken offline to inform them that one of the transceivers 20 is offline and what the new capabilities and attributes of the upgraded transceiver 20 are. With the present method and apparatus, each transceiver 20 in the system can be upgraded individually. The other transceivers 20 in the network 5 can discover that the transceiver 20 whose software is being upgraded is offline and what its new capabilities and attributes are once that transceiver 20 is back online. In one embodiment, the other transceivers 20 use the DSP to discover this information.

Discovery Protocol Selection for 1×EV-DO Embodiment

Specific discovery protocols may be applied in the various discovery scenarios that occur in a 1×EV-DO RAN 5 embodiment. Service requests sent to elements 10 using a mobile IPv6 address (e.g. access attempts using the ACHPacketProtocol) may be encapsulated within a generic encapsulation protocol (GEP) protocol data unit (PDU). The GEP PDU may also contain a TDP advertise message (or TDP Advertise message) that may allow the recipient to discover the requestor.

General Selection Criteria for Detection Protocols

A group discovery protocol may be used for embodiments where the detection features are characterized by one or more of the following embodiments: 1) There was a few-to-many or many-to-many relationship between discoverers and discoverees in a cooperating group of elements 10 (e.g. transceivers 20 and their preferred controllers 15). 2) The members of a cooperating group may vary over time, and it was desirable to do so without requiring external management of membership lists for each of the group members. Group Membership Protocol Subtype Multicast (GMP-M) may be used to fulfill group discovery operations for this embodiment. This method defines different modes of operation for a group's publishers 26 and subscribers 28. The rationales behind the choices for active vs. passive publishers 26, subscribers 28, etc. are described below.

A targeted discovery protocol may be used for embodiments where either of the following is true: 1) The numbers of the elements 10 to be discovered was small and relatively static (e.g. a transceiver's 20 neighbor list or NeighborList). 2) The target of a service request may wish to discover the requestor prior to servicing the request. TDP may be used to fulfill targeted discovery operations for this embodiment.

Controller 15 Discovery by Controller 15

Group Discovery—A typical RAN 5 consists of numerous transceivers 20 and controllers 15. The controllers 15 may be divided into groups, each group associated with a set of preferred transceivers 20. Controllers 15 within the group may wish to form discovery relationships with each other to support load sharing, fault tolerance, or other functionality. Controllers 15 typically discover controllers 15 in neighboring groups to support the ability to efficiently transfer a session when a terminal 40 moves to a transceiver 20 that does not list the current transceiver 20 as preferred. Both these cases involve one or more elements 10 seeking to discover groups of other elements 10, without knowing exactly who the members of the groups are. Indeed, it is desirable to be able to add or remove controllers 15 from these groups without requiring explicit update of all other elements 10. Hence the use of the GMP-M discovery protocol. It is assumed that the number of discoverees and discoverers in a group are roughly equal, so that there is no advantage to the selection of either active publisher 26/passive subscriber 28 or passive publisher 26/active subscriber 28 combination. For this embodiment, the combination (active publisher 26/passive subscriber 28)

was chosen. A publisher's 26 advertise message may indicate that the publisher's 26 element supports DSP. The subscriber 28 may use the DSP contact information within the advertise message to establish a discovery relationship with the publisher 26.

Targeted Discovery—Session transfer and other service requests made by one controller 15 upon another controller 15 with an unknown identifier or ElementId (i.e. to mobile IPv6 addresses) may provide the information used to allow the target of the request to discover the requester. Since this is a request to a specific element 10, multicast/group membership mechanisms are inappropriate. A TDP advertise message may be used to convey the information to the target. The service request and the TDP advertise message may be encapsulated within a GEP PDU. The recipient may determine whether it already has a discovery relationship with the requestor based on the requestor's ElementId. If no relationship exists, the recipient may examine the TDP advertise payload. The advertise message from an element 10 compatible with this realization may indicate that DSP is supported. The recipient may use the associated information to establish the discovery relationship with the requestor. Under certain conditions (such as an element 10 that is known to be unusable based on the capability list signature (or CapablityListSignature), the recipient may choose not to attempt the establishment of a discovery session.

Controller 15 Discovery by Transceiver 20

Group Discovery—The 1×EV-DO embodiment allows one or more controllers 15 to act as preferred controllers 15 to a group of transceivers 20. It is desirable to allow transceivers 20 and controllers 15 to be dynamically added and/or removed from this group during operation. The addition/removal may entail little or no modification to the provisioning of the other members of the group. GMP-M is used to for this embodiment. Transceivers 20 may be configured as subscribers 28 to a discovery group, and the controllers 15 that are expected to serve those transceivers 20 may be configured as publishers 26. By using GMP-M, it is possible to add/remove controllers 15 and transceivers 20 without changing the configuration at each element 10. The preferred controller 15 algorithm running at the transceiver 20 may use the group membership information associated with a received advertise message to know if the advertising element 10 is a candidate for preferred controllers 15. It is assumed that the number of controllers 15 is equal to or less than the number of transceivers 20. Under this assumption, the combination of active publisher controllers 15 and passive subscriber transceivers 20 minimizes the discovery-related network traffic for the group of elements 10.

Transceiver 20 Discovery by Controller 15

Group Discovery—Certain protocols running at a controller 15 discover and retrieve element 10 data from their preferred transceivers 20 (e.g. paging area determination protocol). As noted above, it is assumed that the number of controllers 15 is smaller than the number of transceivers 20. It is desirable to reduce the amount of multicast traffic generated by the members of the group. The combination of GMP-M passive publisher 26/active subscriber 28 achieves this goal. The multicast solicit messages are sent to the group by controllers 15. The response is in the form of unicast advertise messages directed to the solicitor (Subscriber) 28.

Targeted Discovery—Controllers 15 may discover non-preferred transceivers 20 during the normal course of operation. For instance, a paging area determination (PAD) algorithm may use information from a transceiver 20 that is a neighbor of a preferred transceiver 20, but that is not itself a preferred transceiver 20. A controller 15 may send solicit messages (or TDP Solicit messages) to contact any transceiver 20 that it has not found via group-based discovery. The advertise message sent from the transceiver 20 may indicate that it supports DSP, and provide information for the controller 15 to establish the discovery relationship. A transceiver 20 may also initiate a service request to a controller 15 whose identity is known by a mobile IPv6 address.

Transceiver 20 Discovery by Transceiver 20

Group Discovery—Since each transceiver 20 has a unique group of neighbors, the number of groups would be on the order of the number of transceivers 20.

Targeted Discovery—Transceivers 20 may use targeted discovery via TDP to discover their neighbors. A transceiver's 20 neighbor list may be manually configured for this realization. Each transceiver 20 may be configured with the information used to contact its neighbors via TDP Solicit messages. The responding advertise message sent by the neighboring transceiver 20 indicates that it supports DSP, and provide the information used for the soliciting transceiver 20 to establish the discovery relationship.

Preferred Controller-Transceiver Discovery

In the RAN 5 associated with each transceiver 20 is a set of preferred controllers 15. If a terminal 40 that does not have a radio session accesses the system 5 through a transceiver 20, it is directed to a preferred controller 15 so that a radio session can be established for that terminal 40. It is desirable that a transceiver 20 and its preferred controllers 15 detect and maintain a discovery relationship with each other on an ongoing basis. In the reference architecture, the transceivers 20 and their preferred controllers 15 use the GMP-M protocol to discover each other. Two GMP-M groups are defined for this purpose. One group for transceivers 20 to discover their preferred controllers 15 and maintain a preferred controller 15 list. The other group for controllers 15 to discover transceivers 20 for which they are preferred controllers 15.

For group 'Pref Controller', the controller 15 is configured to be an active/multicast publisher 26 and the transceiver 20 is configured to be a passive subscriber 28. In this configuration, the controller 15 periodically sends advertise messages to a multicast address (eg: M2) to which the transceiver 20 listens passively, i.e., transceiver 20 sends no solicits.

For group 'Pref Transceiver', the transceiver 20 is configured to be a passive/unicast publisher 26 and the controller 15 is configured to be an active subscriber 28. In this configuration, the controller 15 periodically sends solicit messages to a multicast address (eg: M3) to which the transceiver 20 listens. The transceiver 20 does not send any periodic advertise messages. It 20 listens for solicit messages from controllers 15 and responds with an advertise message sending it to the unicast address of the soliciting controller 15.

Figure 3:
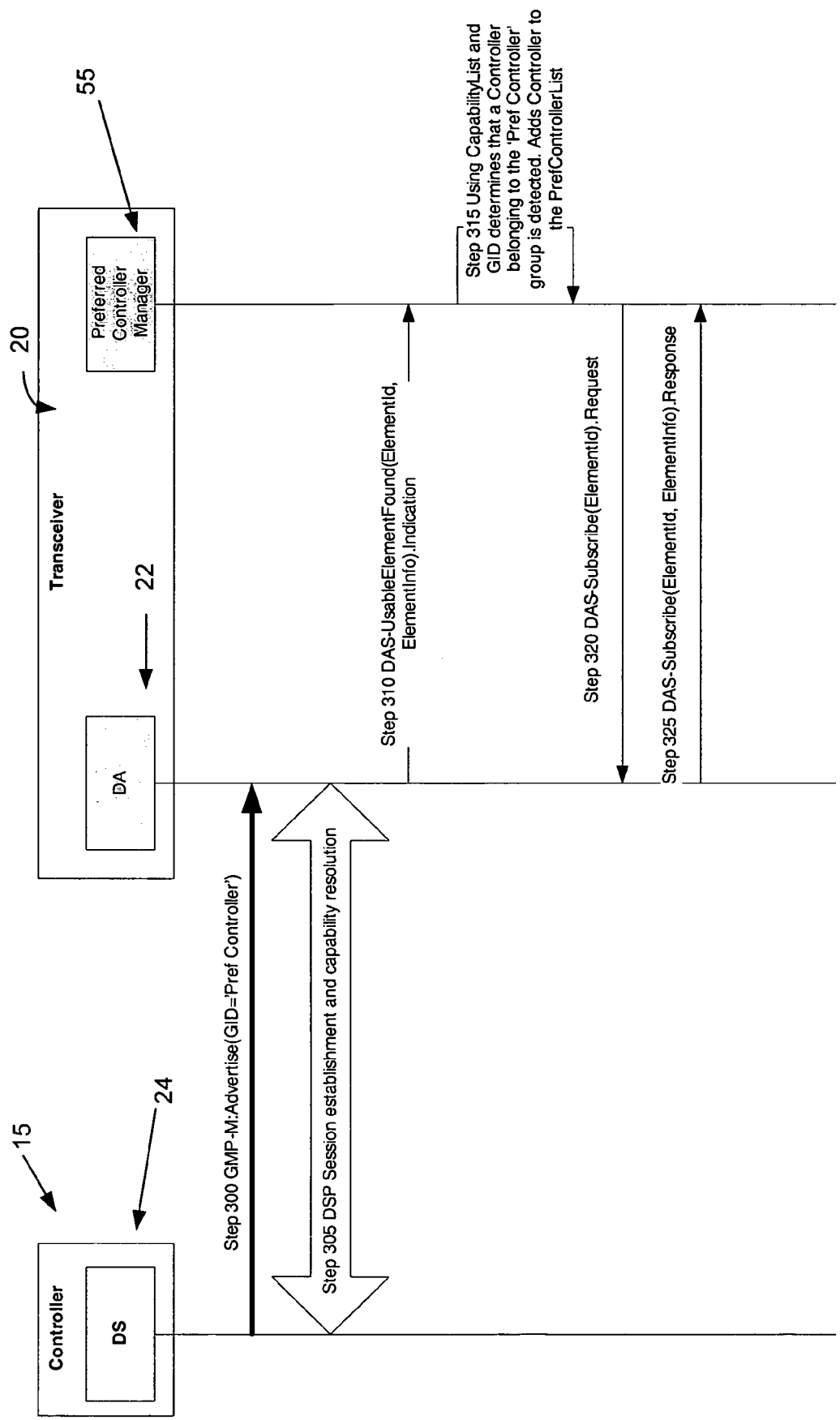
FIG. 3 illustrates the call flow executed by a transceiver when performing discovery of preferred controllers.
Figure 4:
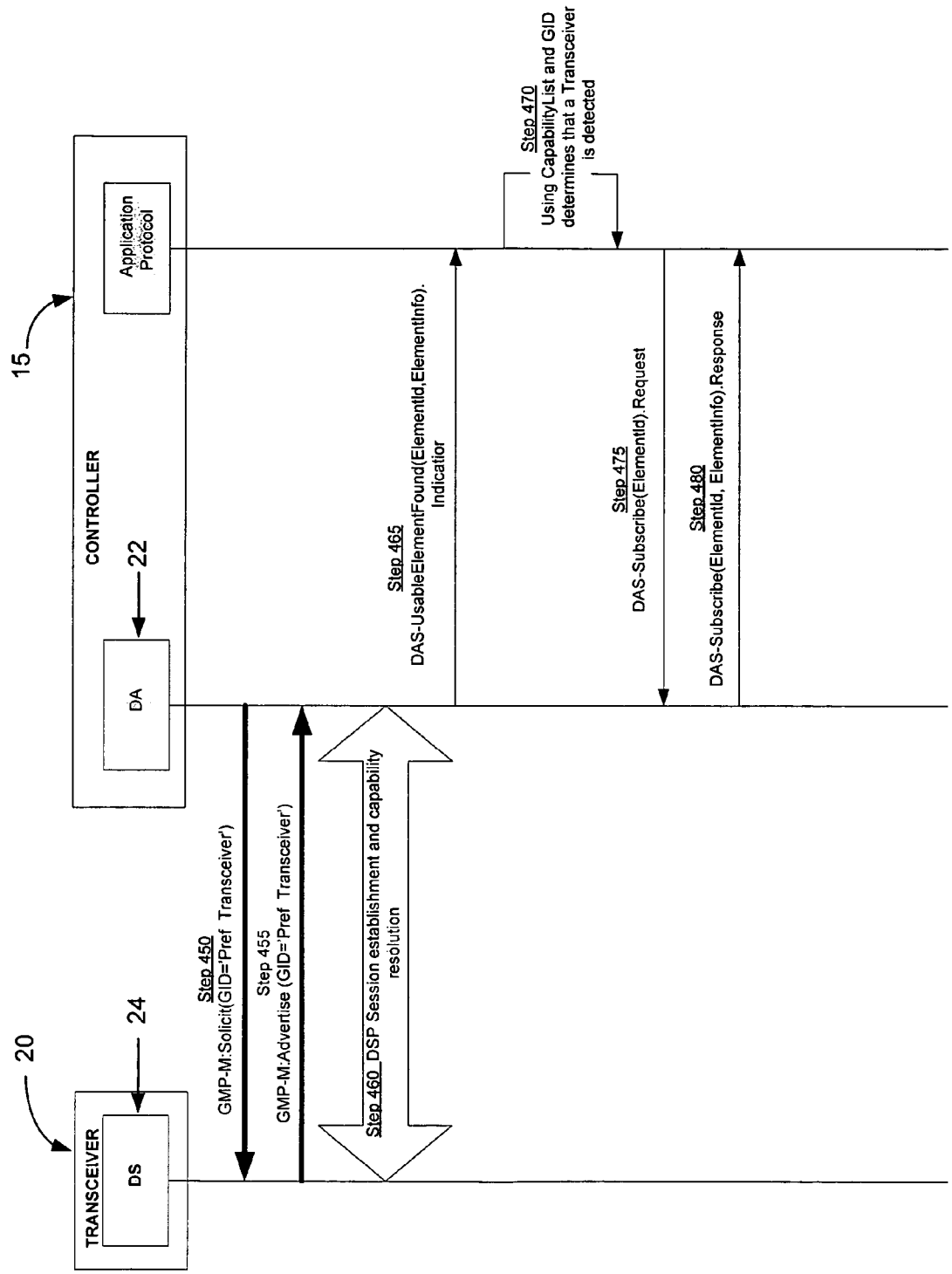
FIG. 4 illustrates the call flow executed by controllers when performing discovery of transceivers.

Using the example group configuration provided above, the flowcharts and call flows of FIGS. 3 and 4 illustrate the discovery interaction. The 'Preferred Controller Manager' 55 shown in FIG. 3 is a logical entity that is responsible for maintaining the 'Preferred Controller List'.

The following steps are executed in the call flow shown in FIG. 3 which illustrates the call flow executed by a transceiver 20 when performing discovery of preferred controllers 15:

Step 300—As an active/multicast publisher 26, the controller 15 periodically sends advertise messages to a multicast address to which the transceiver 20 listens.

Step 305—The transceiver 20 establishes a DSP session with the controller 15, resolves the controller's 15 capabilities and determines that the controller 15 is useful.

Step 310—The DA 22 informs application protocols that a new element 210 is detected.

Step 315—Using the CapabilityList and the group identifier (GID), the Preferred Controller Manager 55 determines that it has detected a controller 15 that belongs to the 'Pref Controller' group. It adds the newly detected controller 15 to its 'Preferred Controller List'.

Step 320—The Preferred controller Manager 55 registers its interest in the controller 15 by issuing a DAS subscribe request (or DAS-Subscribe.Request).

Step 325—The DA 22 responds by sending a DA subscribe element response (or DA-SubscribeElement.Response) that indicates a successful subscription. The application protocol is free to request element 10 data from the controller 15.

The following steps are executed in the call flow shown in FIG. 4 which illustrates the call flow executed by controllers 15 when performing discovery of transceivers 20.

Step 450—The controller 15 being an active subscriber 28 sends periodic solicit messages to the solicit multicast address (or SolicitMulticastAddress) of the 'Pref Transceiver' group to which the transceiver 20 listens.

Step 455—As a passive/unicast publisher 26, the transceiver 20 responds by sending a unicast advertise message to the controller 15 that sent the solicit message.

Step 460—The controller 15 establishes an DSP session with the transceiver 20, resolves the transceiver's 20 capabilities and determines that the transceiver 20 is useful.

Step 465—The DA 22 informs application protocols that a new element 10 is detected.

Step 470—Using the CapabilityList and the GID, the application protocol determines that it has detected a transceiver 20.

Step 475—The application protocol registers its interest in the transceiver 20 by issuing a DAS-Subscribe.Request.

Step 480—The DA 22 responds by sending a DAS subscribe response (DAS-Subscribe.Response) that indicates a successful subscription.

Step 485—At this point, the controller 15 may examine the transceiver's 20 element data (or Element Data) to help determine whether the transceiver 20 should be added to its "preferred RAN.T list."

Elements Currently Limited to Communication with Other Elements in the Domain

In prior art WRANs 5, the network elements 10 are limited to communication only with other elements 10 within the domain. Since elements 10 in different administratively scoped domains do not have a mechanism to exchange the information used to determine whether they are interoperable, there is limited possibility for a smooth transfer of control between elements 10. This architecture precludes the possibility that elements 10 may be "loaned" temporarily to other domains while the transfer of control takes place.

For example, in FIG. 1, the mobile is seen moving from a group of transceivers 20 controlled by a first controller 15 to the group of transceivers 20 controlled by second controller 15. During the handoff from transceiver A 20 (controlled by the first controller 15 to transceiver B 20 (controlled by the second controller 15), it will stop communicating with the first controller 15 and start communicating with the second controller 15. In the prior art systems, the second controller 15 does not know the mobile's 40 session and connection information, only the first controller 15 does. Thus, when the handoff occurs, the mobile 40 would initially be rejected by the second controller 15. The mobile 40 would establish a new session with the second controller 15 before continuing its communication.

In the present method and apparatus, the transceivers 20 in the second controller's 15 group would be able to provide information allowing controller A to temporarily control transceiver B 20 to maintain the call. Thus, transceiver B 20 can effectively act as part of the first controller's extended family until control is transferred from the first controller 15 to the second controller 15. This prevents any interruption in service to the mobile as it crosses boundaries.

In one embodiment, access channel message forwarding is used to allow a controller 15 to communicate with a mobile 40 that just entered its group of transceivers 20, but for whom a former controller 15 still hosts the radio session for that mobile terminal 40.

In the cdma2000 1×EV-DO RAN, an access channel message sent by the mobile terminal 40 is received by the access channel handler protocol (or ACH Protocol) at the transceiver 20. Based on the type of address used by the mobile terminal 40 in the access channel message, the transceiver 20 constructs a mobile IPv6 address that can be used to reach a controller 15 that hosts the radio session for that mobile terminal 40. The controller 15 that receives the access channel message has to discover the transceiver 20 before it can use that transceiver 20 to provide service to the mobile terminal 40. In order to ensure that controller 15 can discover it, the transceiver 20 sends an embedded advertise message (or TDP 'Embedded Advertise' message) along with the Access Channel message in a single GEP PDU.

Figure 5:
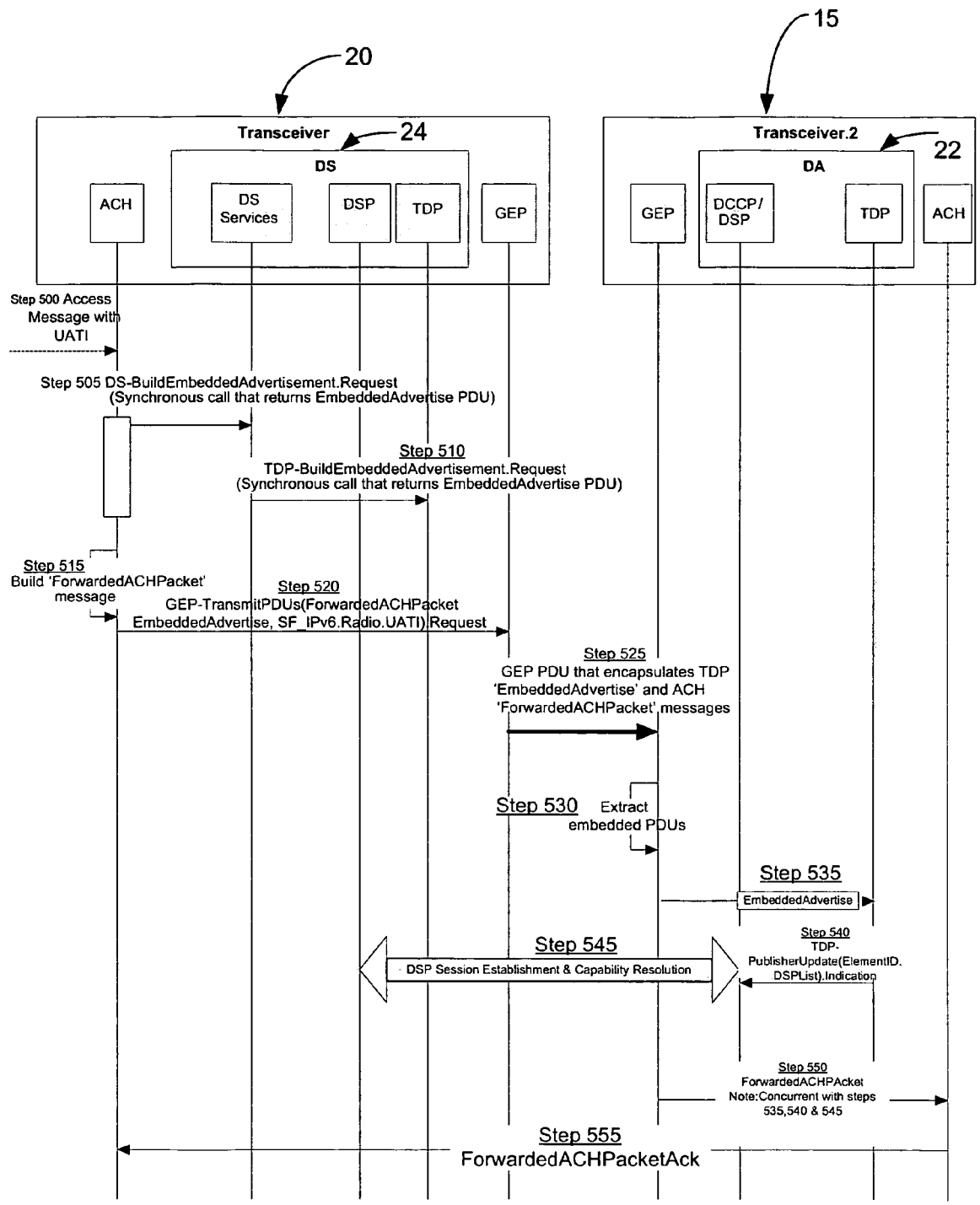
FIG. 5 which illustrates the call flow executed by controllers when performing access channel packet forwarding.

The call flow shown below illustrates this interaction for a 1×EV-DO based RAN 5 system. The following steps are executed in the call flow shown in FIG. 5 which illustrates the call flow executed by controllers when performing access channel packet forwarding:

Step 500—An access terminal 40 sends an access channel message using a unique access terminal identifier (UATI). The message is received by the ACH protocol on the transceiver 20. Since, the access terminal 40 used a UATI, the ACH assumes that a session exists for the access terminal 40. It decides to forward the message to a controller.DR using a mobile IPv6 session address constructed with the UATI. Controller.DR is a resource on a controller 15 that has been allotted to support one particular user or terminal 40.

Step 505—The ACH includes a discovery advertisement message along with the access channel message so that the controller 15 receiving the message can discover the host transceiver 20. It requests the DS 24 to build a discovery advertisement message. This is a synchronous request processed by the DS Services.

Step 510—The DS Services requests TDP to build the discovery advertisement message and returns that to the ACH.

Step 515—The ACH builds the forwarded access channel handler (or ForwardedACHPacket) message that includes the access channel message and other auxiliary data.

Step 520—The ACH requests the GEP to encapsulate both the ForwardedACHPacket and the TDP Embedded Advertise message into a GEP PDU and transmit it to the session address constructed in step 400 above.

Step 525—The GEP protocol on the transceiver 20 encapsulates both the ForwardedACHPacket and the TDP Embedded Advertise message into a GEP PDU and sends it to the controller 15.

Step 530—The GEP protocol on the controller 15 extracts the encapsulated PDUs and uses the protocol identifiers (or ProtocolIds) to dispatch the PDUs to the appropriate protocols.

Step 535—The GEP forwards the TDP Embedded Advertise message to the TDP protocol.

Step 540—The TDP extracts the PublisherInfo from the Embedded Advertise message and issues a TDP publisher update indication (or TDP-PublisherUpdate.Indication).

Step 545—A discovery session is established with the transceiver 20 that sent the access channel message along with assessment of the transceiver's 20 capabilities.

Step 550—The GEP forwards the ForwardedACHPacket message to the ACH protocol on the controller 15. Note that this step can be concurrent with steps 535, 540 and 545.

Step 555—The ACH protocol on the controller 15 acknowledges the ForwardedACHPacket from the transceiver 20.

Mobility Triggered Session Transfer

Eventually, as the mobile terminal 40 moves across the radio network 5 it is desirable to transfer the radio session to the controller.DR which controls the transceiver 20 with whom the mobile terminal is communicating. In the cdma2000 1x or 1xEV-DO RAN 5, a controller.DR maintains the radio session for a single mobile terminal 40. The controller 15 to which the session is transferred is determined based on the Preferred Controller List. Every transceiver 20 has its own preferred controller list and the nonpreferred controller 15 chooses from that list. The controller 15 that is currently holding the radio session for the terminal 40 is called the source controller 15 and the controller 15 to which the radio session needs to be transferred is called the target controller 15. The source controller 15 uses the TDP protocol to discover the target controller 15. After discovering the target controller 15, the source controller 15 initiates the session transfer.

Figure 6:
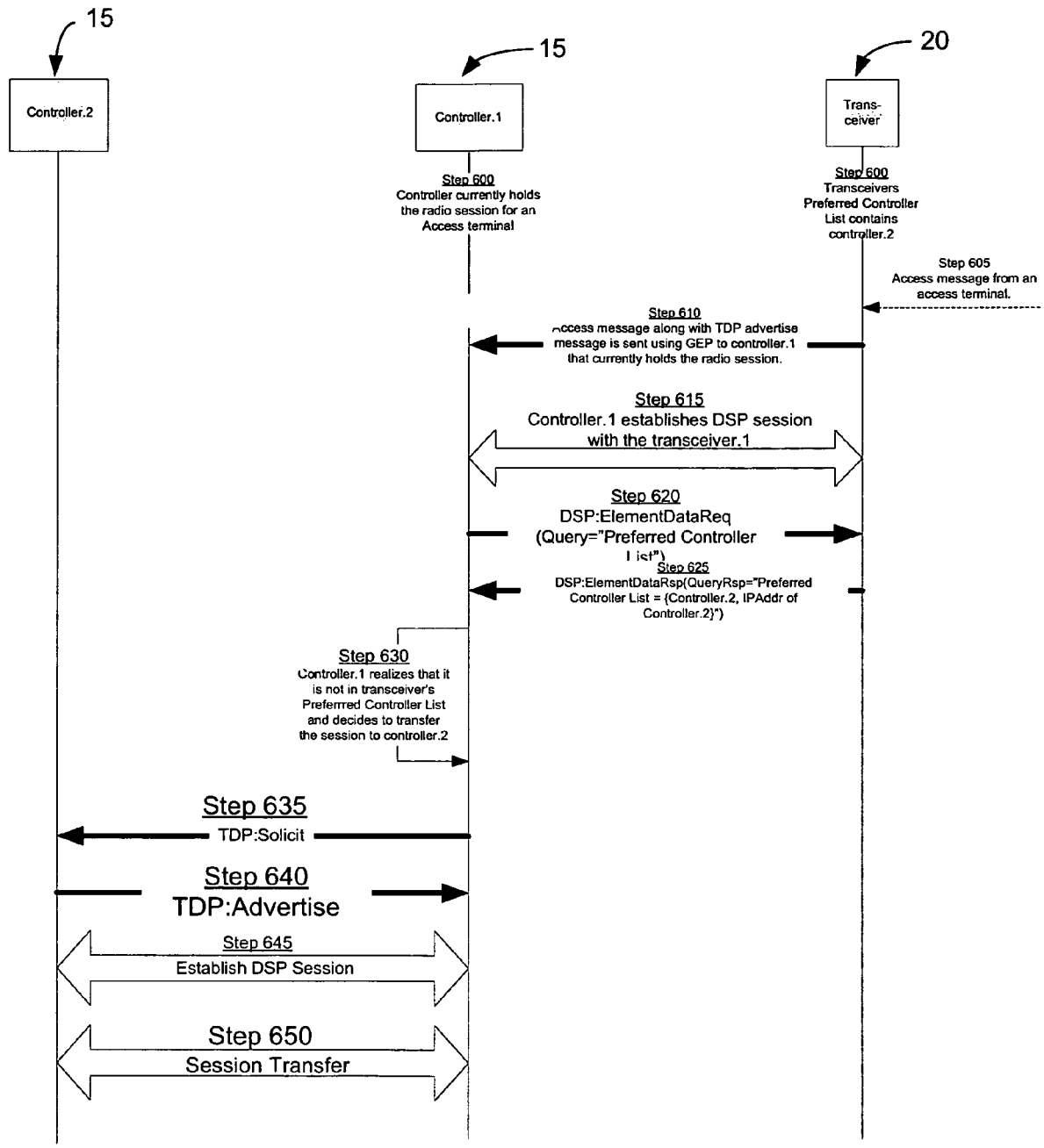
FIG. 6 illustrates the call flow executed during a Mobility Triggered Session Transfer.

The following steps are executed in the call flow shown in FIG. 6 which illustrates the call flow executed during a Mobility Triggered Session Transfer:

Step 600—The controller.1 (15) holds the radio session for an AT 40. Also, transceiver 20 has controller.2 (15) in its Preferred RAN.C List.

Step 605—The AT 40 moves into the area of transceiver 20 and performs a distance based registration by sending an access channel message with the random access terminal identifier (RATI) for the current radio session. The transceiver 20 receives the message.

Step 610—The transceiver 20 forwards the access channel message along with an TDP Embedded Advertise message to the session address which is a mobile IPv6 address constructed using the UATI.

Step 615—The controller.1 (15) that currently holds the radio session for the AT 40, receives the above messages and establishes a discovery session with the transceiver 20.

Step 620—The controllers (15) requests the transceiver 20 for its Preferred Controller List.

Step 625—The transceiver 20 responds with the Preferred Controller List. In this case, the list contains the ElementId for controller.2 (15).

Step 630—The controller.1 (15) realizes that it is not in the transceiver's 20 Preferred Controller List. It decides to transfer the radio session to another controller 15 from the transceiver's 20 Preferred Controller List. In this case, it decides to transfer the radio session to controller.2 (15).

Step 635—The controller. (15) sends one or more TDP Solicit messages to controller.2 (15).

Step 640—The controller.2 (15) responds with a TDP Advertise message.

Step 645—The controller.1 (15) establishes discovery session with controller.2 (15), resolves its capabilities and finds that controller.2 (15) has sufficient capabilities to transfer the radio session.

Step 650—The controller.1 (15) and controller.2 (15) collaborate with each other to transfer the radio session.

Session Discovery and Transfer

In the RAN 5, it is desirable that a single controller.DR maintain all the radio sessions for a single mobile terminal 40 irrespective of the radio technology. If an access terminal 40 sends an access message requesting a new session, a new controller.DR is allocated to host the session for that terminal 40. Before establishing a radio session with the terminal 40, the new controller.DR checks if other radio sessions exist for the access terminal 40. In order to locate any existing radio sessions, the new controller.DR sends 'Session Ping' message(s) to the SL_IPv6.Session address(es) constructed using the access terminal's 40 IMSI or ESN. If other radio sessions exist, the old controller.DR that is currently hosting those sessions is responsible for initiating a session transfer to the new controller.DR. Before it can transfer the session to the new controller.DR, it discovers the new controller 15. In order to ensure that the old controller 15 can discover the new controller 15, the new controller.DR includes both the 'Session Ping' and an TDP 'Embedded Advertise' PDU in a GEP PDU and sends it to the SL_IPv6.Session address. The old controller.DR that receives this PDU can extract the 'Embedded Advertise' message and use it discover the new controller 15.

The call flow for the discovery aspects of this interaction is similar to the access channel message forwarding described earlier.

Paging Area Determination

In the cdma2000 1x or 1xEV-DO RAN 5, a controller 15 uses the PAD protocol to determine the list of transceivers 20 that are used to page an access terminal 40. The PAD protocol uses the NeighborList of each transceiver 20 and recursively builds a paging area centered at that transceiver 20. Using the NeighborList of each transceiver 20, the controller 15 uses the TDP protocol to discover neighboring transceivers 20 that it has not discovered already (for example, as part of the preferred controller 15-transceiver 20 discovery). The following call flow illustrates this interaction.

Figure 7:
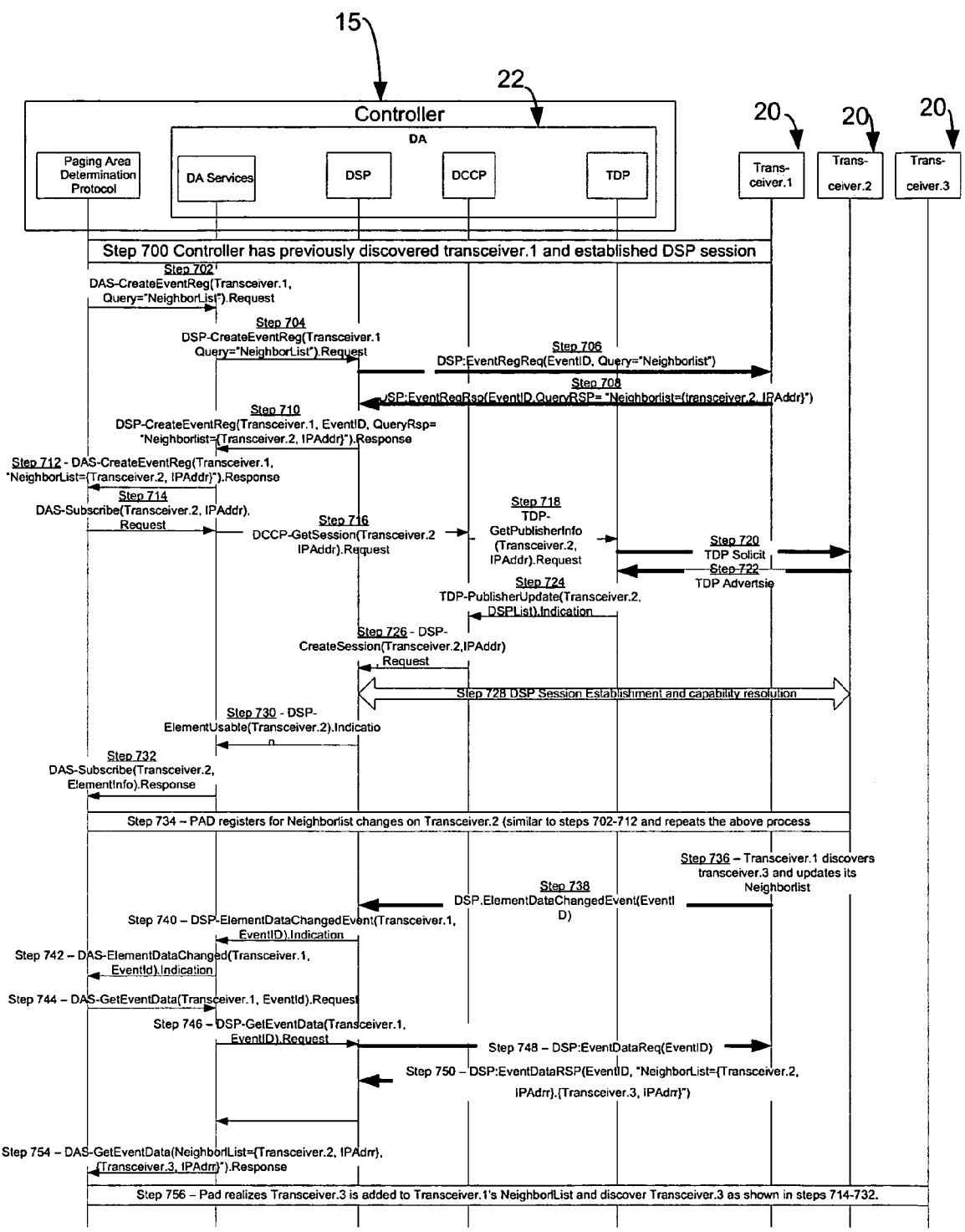
FIG. 7 which illustrates the call flow executed when performing Paging Area Determination (PAD)

The following steps are executed in the call flow shown in FIG. 7 which illustrates the call flow executed when performing paging area determination:

Step 700—The controller (15) has previously discovered transceiver.1 (20). The PAD protocol subscribes to the element 10 upon hearing that it is usable (not shown in the figure).

Step 702—The PAD protocol registers with the DA Services for event notifications that indicate changes to NeighborList data on transceiver. 1(20).

Step 704—The DA Services propagates the request to DSP.

Step 706—The DSP sends an event register request (or EventRegReq) message that contains the event query for NeighborList to the DS 24.

Step 708—The DS 24 responds with an event register response (or EventRegRsp) message that contains the initial values for the NeighborList. In this case, the NeighborList contains the ElementId for transceiver.2 (20).

Step 710—The DSP sends the initial values for the event data to the DA Services.

Step 712—The DA Services provides the initial values to the PAD.

Step 714—The PAD protocol expresses its interest in transceiver.2 (20) by sending a subscription request to the DA 22. As part of the subscription request, it provides the ElementId for transceiver.2 (20) to the DA 22.

Step 716—The DA Services does not have any record of an existing session with transceiver.2 (20) (i.e. no previous DSP usable element found indication (or DSP-UsableElementFound.Indication) was received for this element). It requests that DCCP create a session with transceiver.2 (20).

Step 718—The DCCP requests TDP to retrieve the PublisherInfo (CapabilityListSignature and DSPList) for transceiver.2 (20).

Step 720—The TDP sends one or more solicit messages to the DS 24 of transceiver.2 (20).

Step 722—The TDP at transceiver.2 (20) receives the above solicit message and responds with an advertise message that contains the PublisherInfo.

Step 724—The TDP receives the advertise message and issues a TDP publisher update indication (or TDP-PublisherUpdate.Indication) that includes the PublisherInfo of transceiver.2 (20).

Step 726—The DCCP receives the TDP-PublisherUpdate.Indication, extracts the DSPList from the indication, chooses a DSP protocol (in this case DSP) and requests it to create an DSP client 32.

Step 728—The DSP establishes a session with transceiver.2 (20), resolves the capabilities of transceiver.2 (20) and finds it to be usable.

Step 730—The DSP issues an DSP-ElementUsable.Indication notifying that a new usable element 10 is detected.

Step 732—The DA Services receives the above DSP-ElementUsable.Indication and informs the NeighborList Manager 50 that the subscription to transceiver.2 (20) has succeeded. (It also sends a DAS-UsableElementFound.Indication, which is not shown in this diagram).

Step 734—The PAD registers for NeighborList changes on transceiver.2 (20). It repeats the steps above to discover any additional transceivers (20) contained in transceiver.2's (20) NeighborList.

Step 736—At some point, transceivers (20) discovers transceiver.3 (20) and adds it to its NeighborList.

Step 738—The transceivers (20) sends an element data changed event (or ElementDataChangedEvent) to the controller (15) with an event identifier (or EventId) that corresponds to the registration in step 702 above.

Step 740—The DSP issues an indication notifying the change to the NeighborList.

Step 742—The DA Services informs PAD of a change to the data.

Step 744—PAD requests the data associated with the change.

Step 746—The DA Services receives the above indication and requests DSP to fetch the updated NeighborList.

Step 748—The DSP requests transceiver.1 (20) to send the updated NeighborList data.

Step 750—The transceivers (20) sends an event data response (or EventDataRsp) message that includes the updated NeighborList. In this case, the NeighborList includes ElementId for both transceiver.2 (20) and transceiver.3 (20).

Step 752—The DSP propagates the updated NeighborList to DA Services.

Step 754—The DA Services provides the updated NeighborList to PAD.

Step 756—The PAD realizes that a new element transceiver.3 (20) is added to the NeighborList of transceivers (20) and discovers transceiver.3 (20) by repeating the above process.

Discovery Groups in RAN 5

Figure 8:
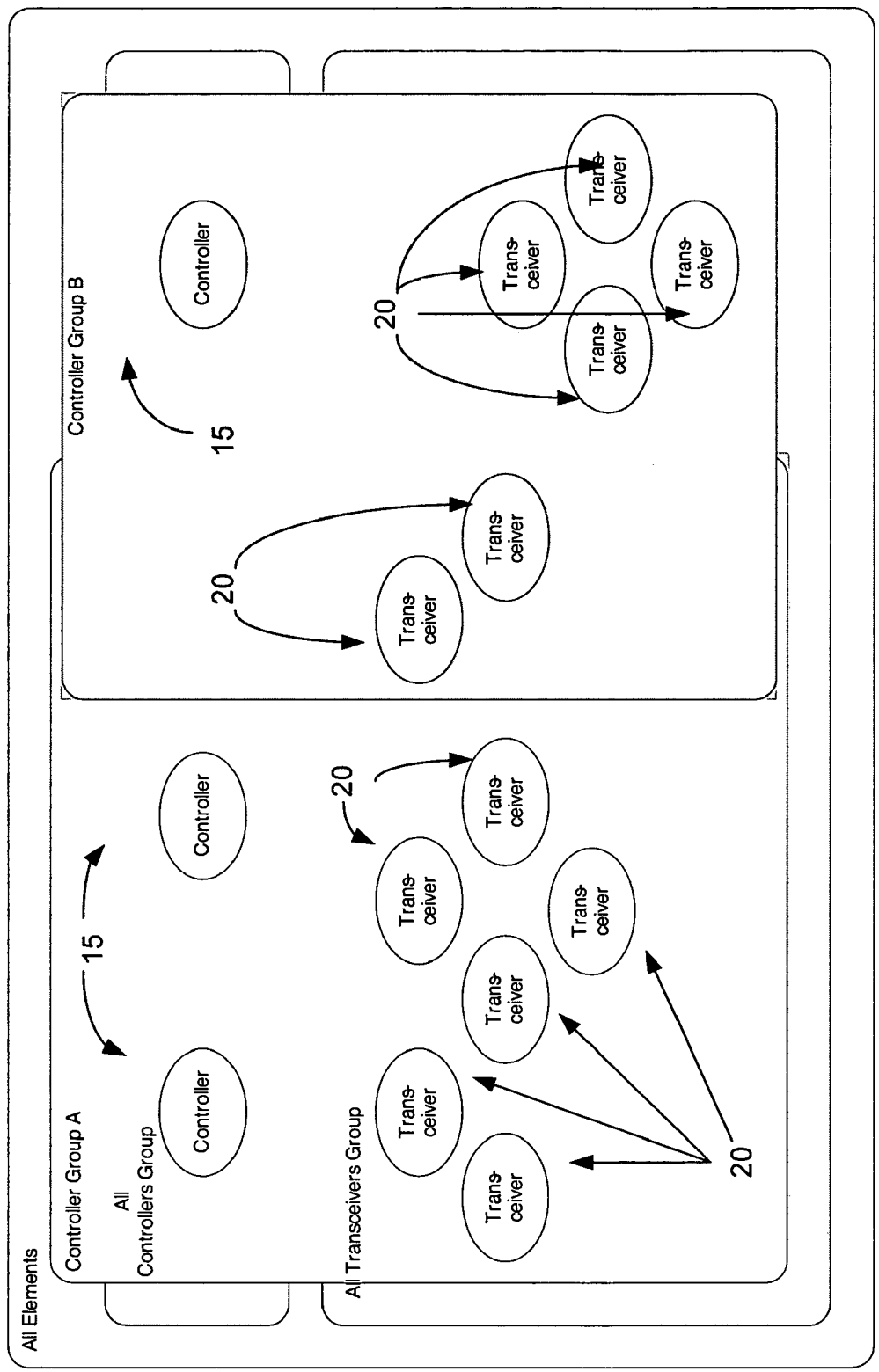
FIG. 8 illustrates overlapping groups in a radio access network.

Elements 10 within an RAN 5 can be configured to be members of one or more discovery groups. The groups may correspond to functional, administrative, transport layer, or other logical or physical characteristics. A GMP discovery group may be defined as a set of elements 10 that are configured to interact with each other, using a single GMP subtype. An element 10 can act in the publisher 26 role, subscriber 28 role, or both, in a group. FIG. 8 shows a scenario of overlapping groups where the group "Controller Group A" consists of two controllers 15 and multiple transceivers 20. Two of the transceivers 20 from this group are also members of the "Controller Group B" group. In addition, all three controllers 15 are members of the "All Controllers Group". Similarly, all the transceivers 20 are also members of "All Transceivers Group", and so on.

Figure 9:
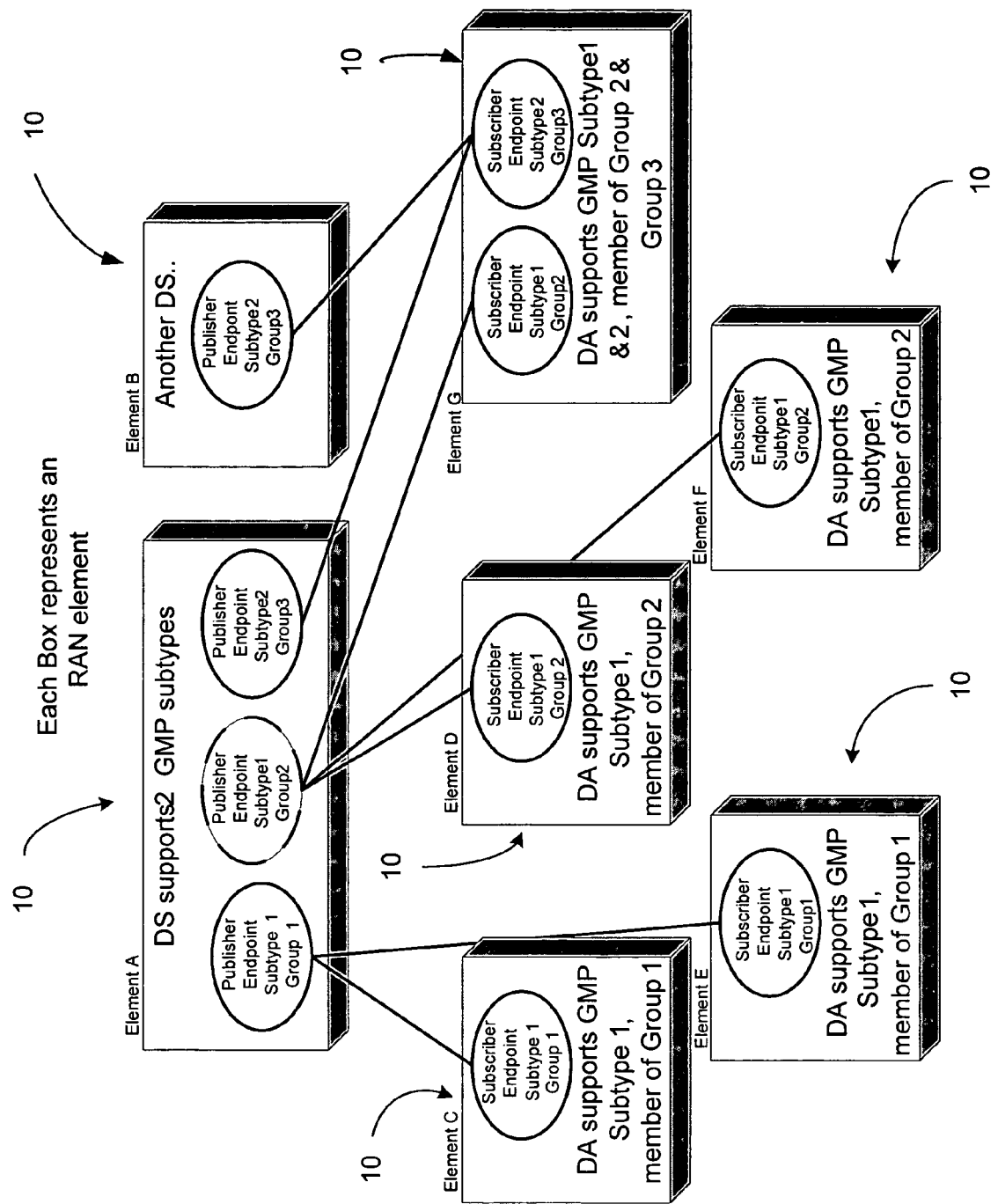
FIG. 9 illustrates an example of discovery server's (DS) and discovery agent's (DA) hosting multiple group membership protocol (GMP) endpoints for different protocol subtypes and discovery groups.

FIG. 9 shows an example of how multiple GMP subtypes co-exist in a RAN 5.

FIG. 9 shows an embodiment where element A is a publisher 26 to Groups 1 and 2 (which use one GMP subtype) and also a publisher 26 to Group 3 (which uses another GMP subtype). The DS 24 for this element 10 hosts publishers 26 for each supported subtype, whereas the DS 24 for element B (or elementB) only supports a publisher of GMP subtype 2. Similarly, the DAs 22 of elements C-F only support one GMP subtype and host that kind of subscriber 28, whereas the DA 22 of element G hosts subscribers 28 of two different GMP subtypes. It also shows that although an element 10 can be part (publisher 26, subscriber 28, or both) of multiple groups (where each group might use a different GMP subtype), each group may use one GMP subtype.

Group Membership Protocol (GMP) Specification

The following are characteristics of GMP:

Publishers 26 and subscribers 28 are identified by their ElementIds. Each element 10 can be configured as a publisher 26 to one or more discovery groups. An element 10 in the publisher 26 role is responsible for announcing its presence to the subscribers 28 to a discovery group. The components that perform this role are hosted by an element's 10 discovery server entity and are collectively referred to as the publisher 26. By publishing to a discovery group, the element 10 agrees to inform its subscribers 28 about its availability and capability changes.

Each element 10 can be configured as a subscriber 28 to one or more discovery groups. An element 10 in the subscriber 28 role is responsible for receiving announcement messages from publishers 26 to a discovery group. The components that perform this role are hosted by an element's 10 discovery agent entity and are collectively referred to as the subscriber 28. Subscribing to a discovery group allows an element 10 to receive notifications from that discovery group. Each discovery group subscriber is notified when a publisher 26 joins the discovery group and when a publisher 26 changes its PublisherInfo (defined below).

GMP Definitions

GMP Discovery Group—A GMP discovery group is a logical grouping of elements 10. Each GMP discovery group may be assigned a GID and may have an associated group information (GroupInfo).

Group Identifier (GID)—Each discovery group may be identified by a GID.

Group Information (GroupInfo)—The group information (GroupInfo) for a discovery group contains the following fields: i) GID, a group identifier; ii) GMPSubtypeId: RAN protocol identifier assigned to the specific GMP subtype used to form this discovery group; and iii) ContactInfoBlob: The subtype specific contact information for that group, e.g. the multicast group address, or the unicast address of the SIP server, etc. The data-type of this field is specific to each GMP subtype.

Group Member—An element 10 that publishes and/or subscribes to one or more discovery groups is said to be a member of those groups. A member may be identified by its ElementId. A member may be a publisher 26, a subscriber 28, or both to each group. A member may support only the functionality that it needs (i.e. elements 10 are not required to support both the publisher 26 and subscriber 28 roles). Members that publish to one or more groups may have an associated publisher information (or Publisher Information), which is the information provided to the group subscribers 28. The subscribers 28 can use this information to determine the supported DSP protocol subtypes and initiate discovery sessions with the publishers 26.

Element Identifier (ElementId)—Each member of a RAN 5 discovery group is identified by an element identifier (ElementId). The ElementId is unique within a group.

Publisher Information (PublisherInfo)—The publisher information (PublisherInfo) of an element 10 may consist of the following fields: i) The DSPList supported by the element 10. This list contains the ProtocolIds and DSPContactInfoBlob for each supported DSP type; and ii) The CapabilityListSignature. This is a signature generated by the CapListMgr protocol that identifies the contents of the capability list and changes whenever the contents of the capability list change.

Group Primitives

The following primitives are accepted by an GMP publisher 26, and defined below.

GMP-StartPublish.Request: Causes the publisher 26 to start publishing its information to the discovery group.

GMP-StopPublish.Request: Causes the publisher 26 to stop publishing to the discovery group.

GMP-GetSubscribers.Request: Returns a set of ElementIds that act as subscribers 28 to the discovery group.

The following primitives are accepted/issued by a GMP subscriber 28, and defined below.

GMP-Subscribe.Request: Causes the subscriber 28 to start listening to the subtype specific GMP messages.

GMP-Unsubscribe.Request: Causes the subscriber 28 to stop listening to the subtype specific GMP messages.

GMP-PublisherUpdate.Indication: An indication generated by the subscriber 28 when an element 10 in the publisher 26 role joins the discovery group or changes its PublisherInfo.

GMP-GetPublishers.Request: Returns a set of ElementIds that acts as publishers 26 to the discovery group.

GMP-GetPublisherInfo.Request: Causes the receiver to return the PublisherInfo of the specified element 10, if known, in a GMP-PublisherUpdate.Indication.

Group Membership Protocol Subtype Multicast (GMP-M)

The GMP-M is a subtype of the GMP that uses an underlying multicast and unicast IP-based transport. It specifies: 1) the sending of periodic and on-demand multicast advertise messages announcing the presence of elements 10 in a publisher 26 role; 2) The sending of multicast solicit messages requesting elements 10 in a publisher 26 role to send advertise messages; and 3) The sending of unicast advertise messages upon receipt of solicit messages.

Group Publisher 26

A group publisher 26 component is responsible for publishing to a single group. It sends advertise messages and receives solicit messages. Publishers 26 can be provisioned to be active or passive, and provisioned to use either multicast transport, unicast transport, or both (hybrid) to send advertise messages. The following types of publishers 26 are defined for GMP-M:

Active/Multicast Publisher 26: A publisher 26 that autonomously sends out periodic Advertise messages; using multicast.

Active/Hybrid Publisher 26: A publisher 26 that autonomously sends out periodic advertise messages. The periodic messages are sent using multicast while other messages may be sent using unicast.

Passive/Multicast Publisher 26: A publisher 26 that does not send periodic advertise messages autonomously but upon receipt of solicit messages; using multicast.

Passive/Unicast Publisher 26: A publisher 26 that does not send periodic advertise messages autonomously but upon receipt of Solicit messages; using unicast.

Passive/Hybrid Publisher 26: A publisher 26 that does not send periodic advertise messages autonomously but upon receipt of solicit messages; using multicast or unicast.

Active Publisher 26

Figure 10:
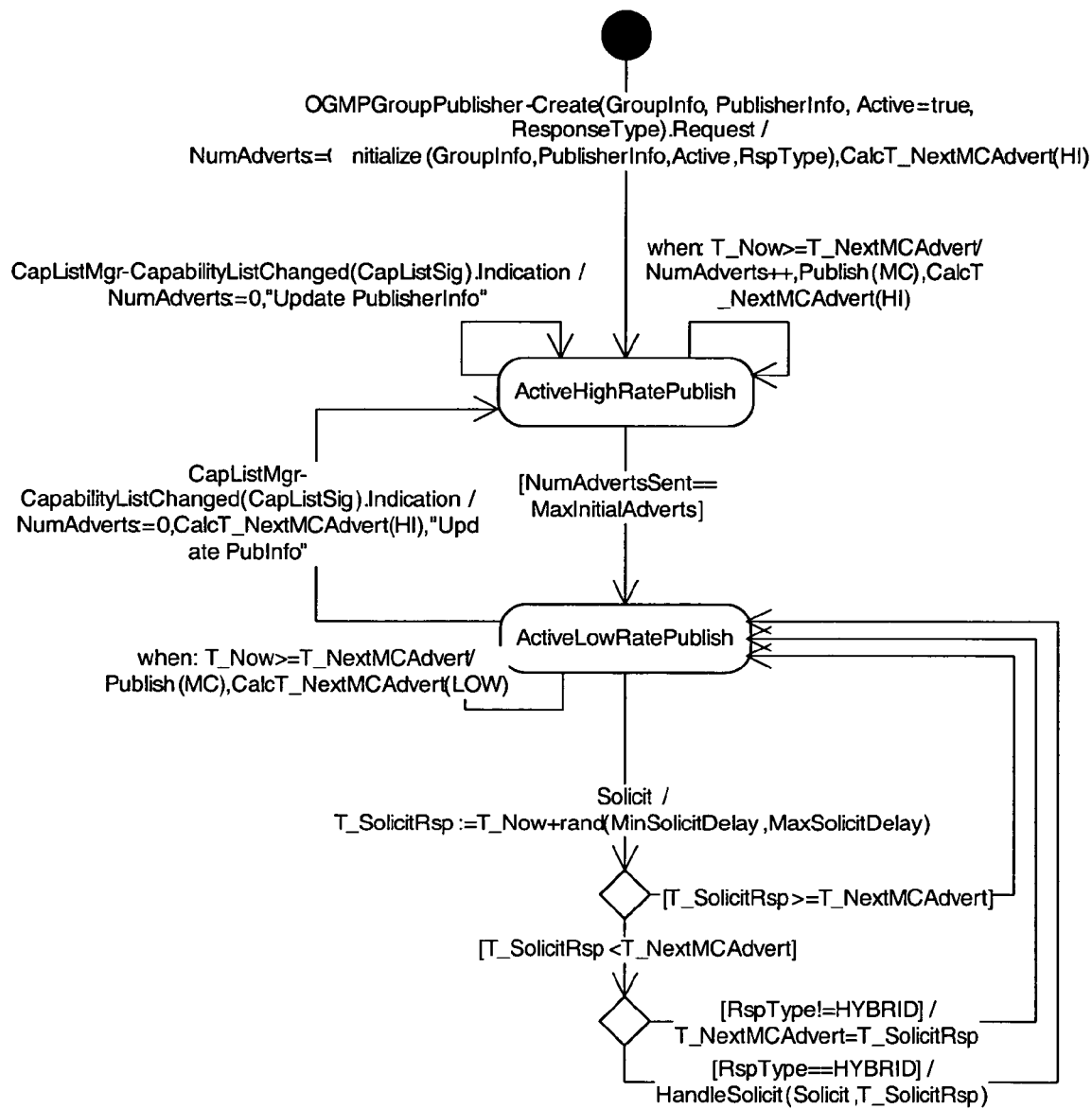
FIG. 10 is a group membership prototype subtype multicast (GMP-M) active group publisher state chart.

Upon becoming enabled, the publisher 26 configured to be active begins sending advertise messages to its AdvertiseMulticastAddress with periodicity as specified in the FIG. 10 below. The receipt of a solicit message on the SolicitMulticastAddress has the following effect (based on the value of the ResponseType parameter of the GMPGroupPublisher-Create.Request):

In the multicast only case, it may alter the time at which the next advertise message is sent. In the hybrid case, it may result in a unicast advertise message to the solicitor, or a multicast advertise message, as specified in the FIG. 10. The active group publisher 26 is created by the publisher manager using the GMPGroupPublisher-Create(GroupInfo, PublisherInfo, Active, ResponseType).Request primitive by specifying a true value for the active parameter. FIG. 10 shows the state diagram for a GMP-M active group publisher 26.

Actions

Initialize Action—The Initialize action may set the following data values:

GID: Initialized to the GroupInfo.GID parameter of the GMPGroupPublisher-Create.Request.

CurrPublisherInfo: Initialized to the PublisherInfo parameter of the GMPGroupPublisher-Create.Request.

SolicitMulticastGroupAddress, AdvertiseMulticastGroupAddress: Initialized to the corresponding fields in the GroupInfo.ContactInfoBlob parameter of the GMPGroupPublisher-Create.Request.

Active: Initialized to the value of the Active parameter in the GMPGroupPublisher-Create.Request. This Boolean value may be set to true for creating active publishers 26.

RspType: Initialized to the value of the ResponseType parameter in the GMPGroupPublisher-Create.Request. This determines whether the publisher 26 uses a multicast or hybrid response type.

NumAdvertsSent: Initialized to 0(zero)

T_NextMCAdvert: Initialized to 0

Publish(RspType) Action—This action may send an Advertise message, using either multicast or unicast, based on the RspType parameter's value as follows:

RspType==MC: The message may be sent to the AdvertiseMulticastGroupAddress.

RspType==UC: The message may be sent to the address specified in the received Solicit message.

The DSPList and the CapabilityListSig fields of the message are filled from the CurrPublisherInfo.

CalcT_NextMCAdvert(rate) Action—This action calculates and sets the value of T_NextMCAdvert variable. Based on the value of the rate parameter, it behaves as follows:

Rate==HI:
T_NextMCAdvert=T_now+rand(MinAdvertInterval, MaxInitialAdvertInterval)

Rate==LOW:
T_NextMCAdvert=T_now+rand(MinAdvertInterval, MaxAdvertInterval)

HandleSolicit(Solicit,Time) Action—This action may schedule the sending of a single Advertise message, to the unicast address specified in the Solicit message and at the time specified as parameter. It ensures that the time between any two successive unicast Advertise messages sent by this publisher may not be less than MinSolicitDelay.

States

ActiveHighRatePublish State—In this state, an active publisher 26 sends multicast Advertise messages at higher rate than the ActiveLowRatePublish state, up to a maximum of MaxInitialAdverts messages. Upon receipt of CapListMgr-CapabilityListChanged.Indication (which is issued when the capabilities of the host element change), it may update the publisher info and reset the NumAdvertsSent variable to zero. Notice that Solicits received while in this state may be ignored.

Entry
None.
Exit
None.

ActiveLowRatePublish State—In this state, an active publisher 26 sends multicast Advertise messages at a lower rate than the ActiveHighRatePublish state, till it gets terminated.

Entry
None.
Exit
None

Passive Publisher 26

Upon becoming enabled, the publisher 26 configured to be passive begins listening for Solicit messages sent to the SolicitMulticastAddress. It sends Advertise messages upon receipt of a Solicit message as follows:

In the multicast only case, it sends the Advertise message to the AdvertiseMulticastAddress.

In the unicast only case, it sends the Advertise message to the unicast address specified in the Solicit message.

Figure 11:
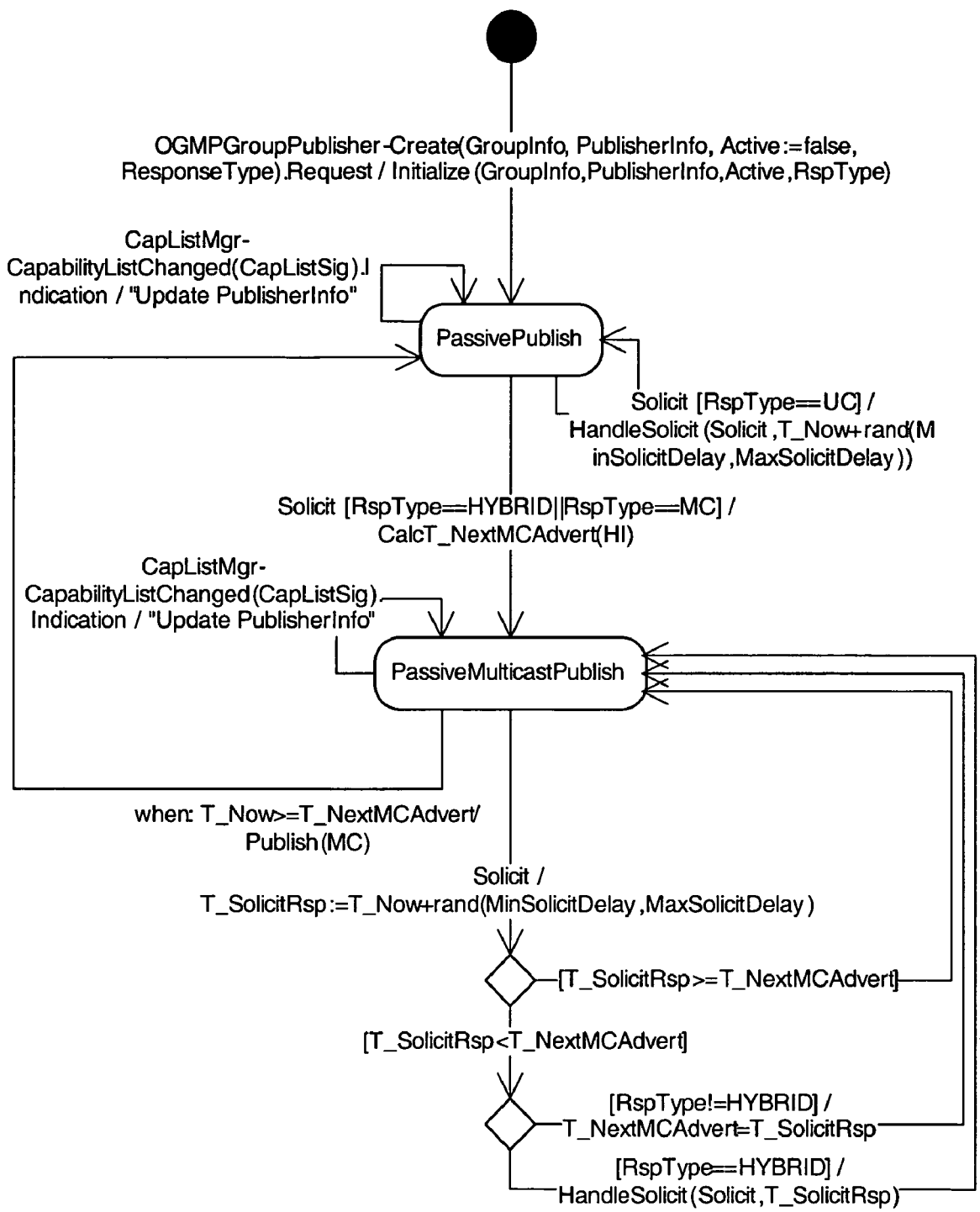
FIG. 11 shows a state diagram for a GMP-M passive group publisher.

In the hybrid case, it may result in a unicast Advertise message to the solicitor, or a multicast Advertise message, as specified in FIG. 11 below.

The passive group publisher 26 is created by the publisher manager using the GMPGroupPublisher-Create(GroupInfo, PublisherInfo, Active, ResponseType).Request primitive by specifying a false value for the Active parameter. FIG. 11 shows the state diagram for an GMP-M passive group publisher 26.

Actions

Initialize Action—The Initialize action sets the following data values:

GID: Initialized to the GroupInfo.GID parameter of the GMPGroupPublisher-Create.Request.

CurrPublisherInfo: Initialized to the PublisherInfo parameter of the GMPGroupPublisher-Create.Request.

SolicitMulticastGroupAddress, AdvertiseMulticastGroupAddress: Initialized to the corresponding fields in the GroupInfo.ContactInfoBlob parameter of the GMPGroupPublisher-Create.Request.

Active: Initialized to the value of the Active parameter in the GMPGroupPublisher-Create.Request. This Boolean value may be set to false for creating passive publishers 26.

RspType: Initialized to the value of the ResponseType parameter in the GMPGroupPublisher-Create.Request. This determines whether the publisher 26 uses multicast, unicast or hybrid response type.

NumAdvertsSent: Initialized to 0.
T_NextMCAdvert: Initialized to 0.

Publish(RspType) Action—This action sends an Advertise message, using either multicast or unicast, based on the RspType parameter's value as follows:

RspType==MC: The message may be sent to the AdvertiseMulticastGroupAddress.

RspType==UC: The message may be sent to the address specified in the received Solicit message.

The DSPList and the CapabilityListSig fields of the message are filled from the CurrPublisherInfo.

HandleSolicit(Solicit,Time) Action—This action schedules the sending of a single Advertise message, to the unicast address specified in the Solicit message and at the time specified as parameter. It ensures that the time between any two successive unicast Advertise messages sent by this publisher 26 is not less than MinSolicitDelay.

CalcT_NextMCAdvert(rate) Action—This action calculates and sets the value of T_NextMCAdvert variable. Based on the value of the rate parameter, it behaves as follows:

Rate==HI:
T_NextMCAdvert=T_now+rand(MinAdvertInterval, MaxInitialAdvertInterval)

Rate==LOW:
T_NextMCAdvert=T_now+rand(MinAdvertInterval, MaxAdvertInterval)

States

PassivePublish State—In this state, a passive publisher 26 waits for the receipt of a Solicit message. Upon receipt of CapListMgr-CapabilityListChaged.Indication (which is issued when the capabilities of the host element change), it updates the publisher info.

Entry
None.
Exit
None.

PassiveMulticastPublish State—In this state, a passive publisher 26 waits for a randomized time and transitions back to the PassivePublish state after sending a multicast Advertise message. If other Solicit messages are received in this state, they may result in unicast Advertise messages being sent after randomized delays. Upon receipt of CapListMgr-CapabilityListChaged.Indication (which is issued when the capabilities of the host element change), it may update the publisher 26 info.

Entry
None.
Exit
None.

Subscriber Specification—The subscriber 28 functionality is logically divided into three types of components:

Subscriber Manager: Handles GMP-Subscribe.Request and creates and deletes Group Solicitors and Advertise Handlers for the GID it is responsible for. An element 10 may host a single instance of this manager for GMP-M subtype.

Group Solicitor: Responsible for sending Solicit messages for a single group.

An element 10 will host zero or more instances of this component.

Advertise Handler: Responsible for processing the Advertise messages from a single publisher 26. An element 10 will host zero or more instances of this component.

A subscriber 28 can be configured to be active or passive:

Active subscriber 28: A subscriber 28 that autonomously sends periodic Solicit messages.

Passive subscriber 28: A subscriber 28 that does not send periodic Solicit messages autonomously, but on demand.

Subscriber Manager—The Subscriber Manager creates and deletes group solicitors and advertise handlers and routes messages and primitives to them based on GID and ElementId. It maintains the following conceptual tables:

SolicitorTable: This table contains columns for GID and GroupSolicitor, where each entry contains the Group Solicitor that is currently sending Solicit messages to a single group with the corresponding GID. Group Solicitors may be added to this table after they are created (if configured as Active Subscriber), upon receipt of the GMP-Subscribe.Request. Group Solicitors may be removed from this table in response to GMP-Unsubscribe.Request.

AdvertiseHandlerTable: This table contains columns for GID, ElementId, and AdvertiseHandler, where each entry contains the Advertise Handler that is currently processing Advertise messages from a single element 10 publishing to the group with the corresponding GID. Advertise Handlers may be added to this table when an Advertise message is received from a previously unknown or new publisher 26 to the group to which the element 10 is subscribed. Advertise Handlers may be removed from this table in response to GMP-Unsubscribe.Request and GMPAdvertiseHandler-AdvertiseProcessingStopped.Indication primitives. The behavior of the Manager may be described by a single-state state machine. The state machine's operation is specified textually.

GMP-Subscribe.Request Processing—At any time, the Manager may receive and process a GMP-Subscribe.Request primitive. This primitive may be issued as a result of provisioning, administrative or operational activities. This primitive provides the GIDs of the groups to which the element may start subscribing to. Upon subscribing to a group, the subscriber 28 may send Solicit messages to the group. Sending these messages may reduce the amount of time used by the element 10 to discover other elements 10. Sending Solicit messages is not required for proper functioning of GMP-M. A RAN 5 may choose to not use these messages. For each GID specified in the request: If configured as active subscriber 28, the Manager may obtain the GroupInfo in an implementation dependent manner; create a Group Solicitor using the internal GMPGroupSolicitor-Create(GroupInfo).Request primitive; add the Group Solicitor to the SolicitorTable.

GMP-Unsubscribe.Request Processing—At any time, the Manager may receive and process an GMP-Unsubscribe.Request primitive. This primitive may be issued as a result of provisioning, administrative or operational activities. For each GID specified in the request, the Manager may search its SolicitorTable for a Group Solicitor that is sending Solicit messages to the group given by GID. If a match is found, the Manager may remove that Solicitor from its SolicitorTable and issue an GMPGroupSolicitor-Delete.Request primitive to that Solicitor. The Manager may search its AdvertiseHandlerTable for Advertise Handlers that are processing Advertise messages from publishers 26 of the group. For each Advertise Handler that is processing Advertise messages from a publisher 26 to the group (given by GID), the Manager may remove that Advertise Handler from its AdvertiseHandlerTable and/or issue an GMPAdvertiseHandler-Delete.Request primitive to that Advertise Handler.

GMP-GetPublishers.Request Processing—At any time, the Manager may receive and process a GMP-GetPublishers.Request primitive. It returns a list of ElementIds, one for each known publisher 26 to the given GID, i.e. one for each Advertise Handler that exists for that GID.

GMP-GetPublisherInfo.Request Processing—At any time, the Manager may receive and process a GMP-GetPublisherInfo.Request primitive. It checks if an AdvertiseHandler exists for the given ElementId. If so, it retrieves the data from the Advertise Handler, using GMPAdvertiseHandler-GetPubInfo.Request. Upon receipt of GMPAdvertiseHandler-GetPubInfo.Response, it generates an GMP-PublisherUpdate.Indication for that ElementId, based on the provided information. Otherwise, it may silently ignore the request.

GMPGroupSolicitor-SolicitsCompleted.Indication Processing—This internal primitive is issued by a Group Solicitor whenever it completes transmitting the Solicit messages to a group. This primitive provides the GID of the group to which Solicits have been stopped. Upon receipt of this indication, the GMP Subscriber Manager searches its SolicitorTable for a Group Solicitor whose GroupInfo.GID matches the GID provided in the indication. If the Manager finds a Solicitor, it may remove it from its SolicitorList. Otherwise, the Manager may silently discard the indication.

GMPAdvertiseHandler-AdvertiseProcessingStopped Processing—This internal primitive is issued by an Advertise Handler whenever it stops processing Advertise messages from a publisher 26. This primitive provides the GID and ElementId of the publisher 26 for which Advertise message processing is stopped. Upon receipt of this indication, the GMP Subscriber Manager may search its AdvertiseHandlerTable for an Advertise Handler whose <GID, ElementId> combination matches the <GID, ElementId> combination provided in the indication. If found, the Advertise Handler may be removed from its AdvertiseHandlerList. Otherwise, the Manager may silently discard the indication.

Advertise message processing—The Manager may receive all Advertise messages for this protocol that are sent to the AdvertiseMulticastAddress. These messages may be received at any time during the Manager's operation. Upon receipt of an Advertise message, the Manager may check its AdvertiseHandlerTable for the existence of an Advertise Handler whose <GID, ElementId> combination matches the <GID, PublisherElementId> combination from the message. If found, the Manager may forward the Advertise message to that Handler.

If a matching Advertise Handler does not exist, the Manager may create an Advertise Handler using the internal GMPAdvertiseHandler-Create(GID, Advertise).Request primitive and pass the Advertise message as a parameter. The Manager may then add the newly created Handler to its AdvertiseHandlerTable.

Group Solicitor

Figure 12:
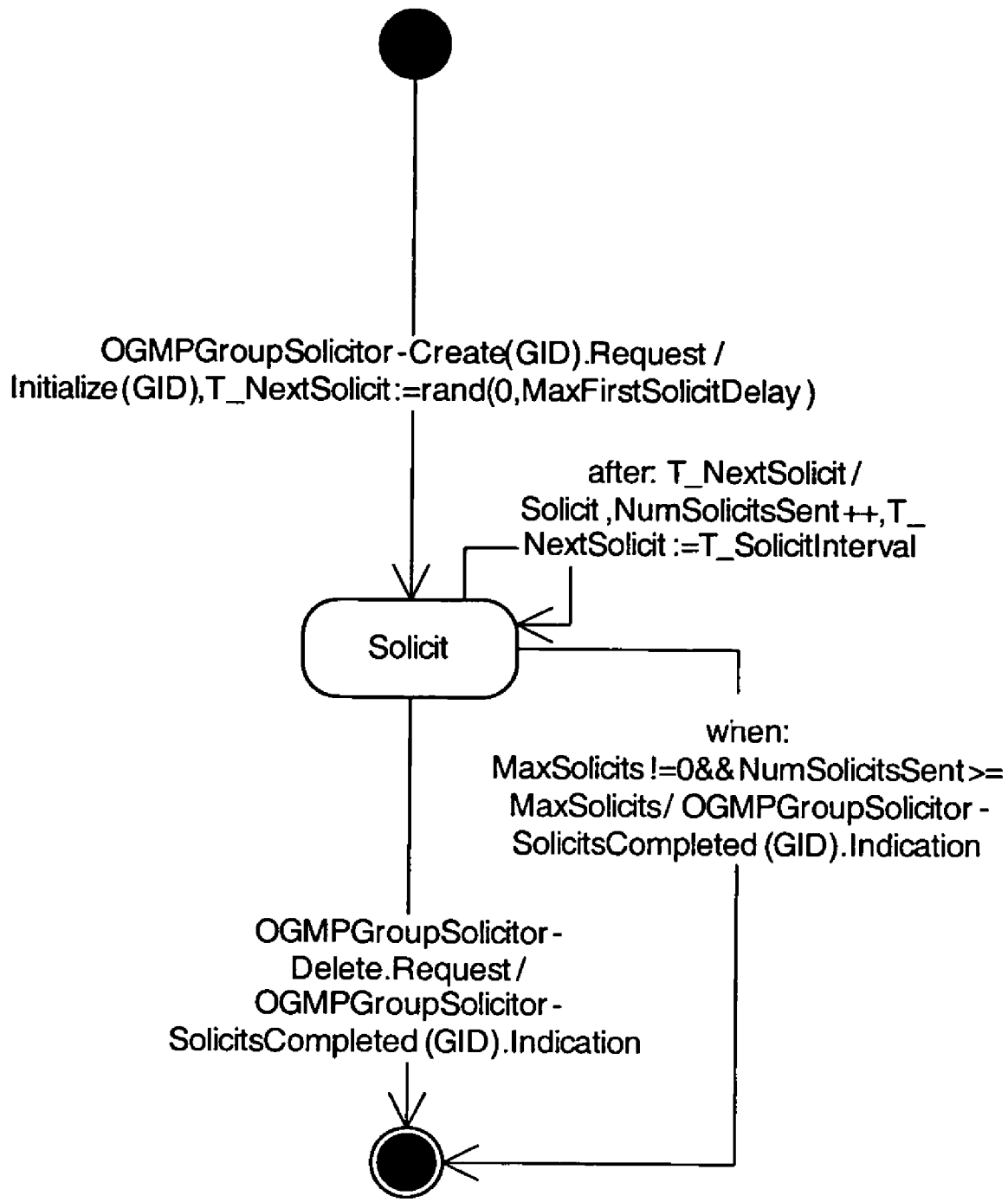
FIG. 12 shows a state chart for an active group solicitor.

Upon creation, an Active Solicitor may periodically send Solicit messages to the IP multicast group address specified by GroupInfo.SolicitMulticastGroupAddress. FIG. 12 shows the state chart for an Active Group Solicitor. A Passive Solicitor may send a Solicit message when requested by another protocol/algorithm to the IP multicast group address specified by GroupInfo.SolicitMulticastGroupAddress.

Actions

Initialize—Upon creation, the Active Group Solicitor is initialized as follows: GID is initialized to the GID parameter of the GMPGroupSolicitor-Create.Request.

States

Solicit State—In this state, the Solicitor waits for T_Next-Solicit and then sends a Solicit message, till the number of messages sent exceeds the MaxSolicits threshold.

Entry Procedures
None.
Exit Procedures
None.

Targeted Discovery Protocol (TDP)

The TDP is a discovery detection protocol used by a RAN element 10 to seek and detect the presence of a specific RAN element 10. It supports embedded advertisement to advertise its presence to a specific RAN element 10. In contrast to GMP, the TDP is not used to form groups. Instead, it is used when one element 10 learns about another element 10 through configuration or some other means and may establish a direct relationship with it 10 on a long term or ad hoc basis.

The Embedded Advertisement is an advertise message that is embedded within the PDU of a generic encapsulating protocol (along with the PDU of another protocol) for the purpose of accelerating the discovery process. For example, when a terminal 40 attempts an access using a UATI, the ACH protocol running on a transceiver 20 receives the access attempt. It constructs an encapsulating message that contains the access message as well as an embedded advertise message. It also constructs a mobile IPv6 address based on the UATI and sends the encapsulating message to that address. At this time, the transceiver 20 might have no a-priori knowledge of the identity of the recipient of this message, but the intended recipient is the controller 15 that hosts the radio session for that terminal 40. Before the receiving controller 15 can use the services of the transceiver 20 it needs to set up a discovery session with the transceiver 20 to determine its capabilities. The EmbeddedAdvertise message facilitates and accelerates this process.

Similar to GMP, TDP defines the following roles for RAN elements 10:

Publisher 26 Role: the ability of an element 10 to advertise its presence to another element 10. The publisher 26 role is accomplished by the publisher 26 entity, hosted by an element's 10 discovery server (DS) 24.

Subscriber 28 Role: the ability of an element 10 to seek and detect the presence of another element 10. The subscriber 28 role is accomplished by the subscriber 28 entity, hosted by an element's 10 discovery agent (DA) 22. Anyone skilled in the art will understand that all combinations of an element in any of the publisher 26 roles and another element in any of the subscriber 28 roles may be used. While the protocols described use an IP transport, one of ordinary skill in the art can see that other transport technologies like SIP or CORBA are possible.

Discovery Session Protocol (DSP)

The DSP is used by a RAN element 10 to establish discovery sessions with other elements 10 in the network 5. It allows elements 10 to: i) retrieve an element's 10 CapabilityList; ii) get element 10 data; iii) register for notifications when element 10 data of interest changes; and iv) detect an element's 10 failure through a keep alive (or KeepAlive) mechanism.

The DSP is a client-server protocol. An element's 10 discovery agent 22 entity hosts instances of DSP clients 32 and its discovery server 24 entity hosts instances of DSP servers. For each DSP type supported by an element 10, the instances of clients 32 (of that DSP-type) are managed by a DSP client manager (or DSPClientManager) of that DSP-type. Similarly, the instances of servers 30 are managed by a DSP Server Manager (or DSPServerManager). An element 10 may contain one instance of either manager for each DSP type supported by the element 10. Messages of a specific DSP subtype are processed by the DSPServerManager or DSPClientManager of that subtype, which, in turn, routes them to the appropriate server 30 or client 32 respectively.

An element's DA 22 initiates a discovery session with another element 10 by sending a request to its DS 24. It then retrieves that element's 10 CapabilityList to determine if the element 10 is usable. After a session has been established, the DA 22 can retrieve element 10 data from that element 10, as well as register for notifications whenever data of interest changes. A KeepAlive mechanism ensures that element 10 failure is detected and reported.

A discovery session may not be symmetric. A session that exists between a client 32 on element A and a server 30 on element B (10) does not cause, or require, that the reciprocal session (between Client B (32) and Server A (30)) exist. Sessions are initiated independently by the respective elements' DAs 22 and have independent lifetimes.

Discovery Server 24 Responsibilities—DS 24 may support the ability to host server-side functionality for at least one DSP subtype. RAN 5 implementers are strongly encouraged to implement all DSP subtypes for maximum inter-operability. The DS 24 may route DSP messages to the appropriate DSPServerManager, based on the message's protocol ID.

Discovery Agent 22 Responsibilities—A DA 22 may support the ability to host client-side functionality for at least one DSP subtype. RAN implementers may implement all DSP subtypes for maximum inter-operability. The DA 22 routes DSP messages to the appropriate DSPClientManager, based on the message's protocol ID.

Discovery Session Protocol (DSP) Specification

The discovery session of this subtype is initiated by the DA 22 of an element 10, when it creates a DSPClient (or DSP client) component, which sends a session open request (or SessionopenReq) message to the DS 24 of the element 10 being discovered. Upon receipt of this message, the DS 24 of the element 10 being discovered creates a DSP Server 30 (or DSPServer) component that is responsible for handling this session. The DSPServer 30 responds by sending a session open response (or SessionOpenRsp) that contains a granted session lifetime. The DSPClient 32 is responsible for keeping the session alive by sending keep alive request (or KeepAliveReq) messages if no other DSP-1 messages have been sent in a certain time. The DSPServer 30 may terminate the session if it receives no messages from the client 32 within the specified time. Upon receipt of a SessionOpenRsp message, the session is considered established and now the DSPClient 32 can: i) retrieve CapabilityList using CapabilityListReq/Rsp messages; ii) get notified of CapabilityList changes using CapabilityListChangedEvent message; iii) retrieve element 10 data using ElementDataReq/Rsp messages; iv) register for notifications whenever specified data changes using EventRegReq/Rsp messages; v) get notified of data changes using ElementDataChangedEvent message; vi) retrieve changed element 10 data using EventDataReq/Rsp messages; and vii) delete event registrations using EventRegDeleteReq/Rsp messages.

Discovery Client Creator Protocol (DCCP)

The discovery client creator protocol (DCCP) is hosted by an element's DA 22. It provides a decoupling between discovery detection protocols (GMPs and TDPs) and the discovery session protocol. In the case where the DSPList from the publisher 26 update indication shows that a discovered element 10 can support more than one-DSP, the DCCP chooses an appropriate DSP to use in the establishment of a new session.

The DCCP maintains a table for elements 10 that have been determined to be usable (InUseTable) containing following columns, where each entry shows the DSP Client Manager (or DSPClientManager) responsible for the session with that ElementId: i) ElementId: ElementId of discovered (server) element 10; ii) Publisherinfo: Publisherinfo of the element 10; iii) DSPClientManager: DSPClientManager for the DSP type handling that element 10. It also maintains a table for elements 10 that have been determined to be not usable in the past (NotUsableTable) containing the following columns, where each entry shows the Publisherinfo of the ElementId that was determined to be not usable: i) ElementId: ElementId of discovered (server) element 10; and ii) Publisherinfo: PublisherInfo of the element 10.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Figure 13:
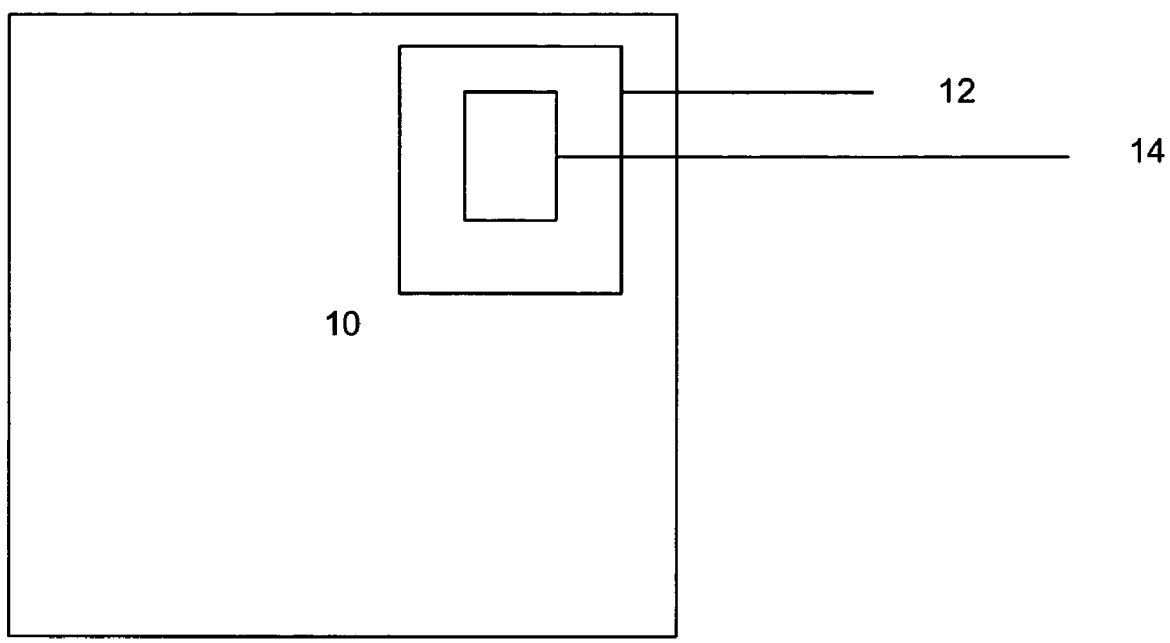
FIG. 13 is a block diagram of a network element.

According to an embodiment, the network element 10 may be implemented in a computer system, which includes a processor, Random Access Memory, RAM, and a program memory for storing instructions to be executed by the processor (not shown). The processor, RAM and program memory may be dedicated to the functions of the network element 10. In other embodiments, the processor, RAM and program. memory may be part of a shared computing resource for performing additional functions at the network element 10. In one embodiment, the steps of the radio access network element 10 method shown in the flowcharts of FIGS. 2-7 reside in the network element 10 in the form of software instructions 14 stored in memory 12 as shown in FIG. 13.

Figure 14:
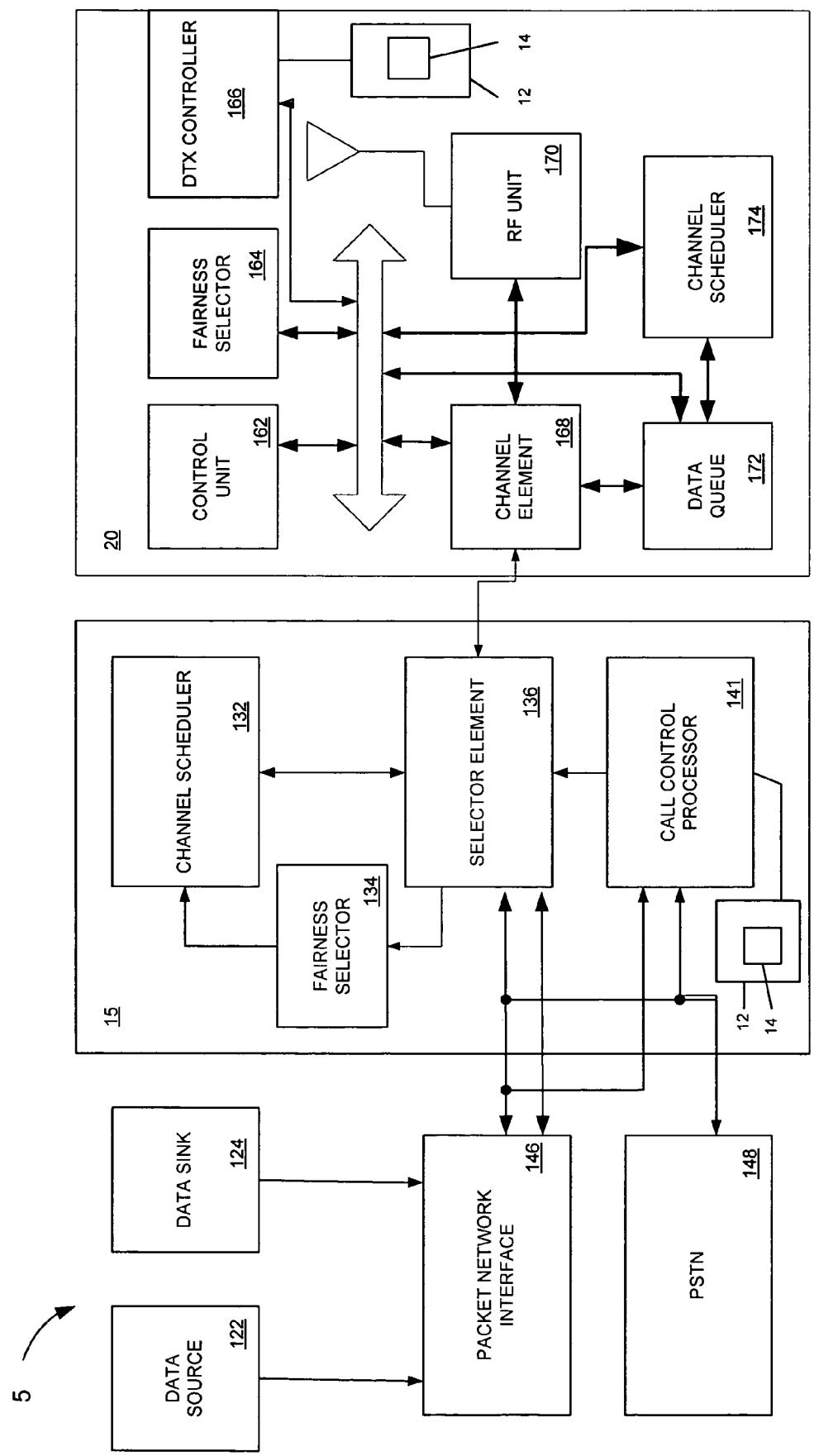
FIG. 14 illustrates one example of a communication system.

One example of a communication system is illustrated in FIG. 14. FIG. 14 is CDMA 1×EV-DO communication system detailed hereinbelow. However, it is noted that the features of the present patent application are not limited to a CDMA 1×EV-DO system. The present invention applies to any CDMA based system (including WCDMA), any OFDM based system and any ultra wideband (UWB) system. The CDMA 1×EV-DO communication system comprises a base station 20 or transceiver 20 and base station controller 15 or controller 15 interface with a packet network interface 146. Base station controller 15 includes a channel scheduler 132 for implementing a scheduling algorithm for transmissions in communication system 5. The channel scheduler 132 determines the length of a service interval during which data is to be transmitted to any particular remote station 40 based upon the remote station's 40 associated instantaneous rate for receiving data (as indicated in the most recently received DRC signal).

In addition, the channel scheduler 132 selects the particular data queue for transmission. The associated quantity of data to be transmitted is then retrieved from a data queue 172 and provided to the channel element 168 for transmission to the remote station 40 associated with the data queue 172. As discussed below, the channel scheduler 132 selects the queue for providing the data, which is transmitted in a following service interval using information including the weight associated with each of the queues. The weight associated with the transmitted queue is then updated.

Base station controller 15 interfaces with packet network interface 146, Public Switched Telephone Network (PSTN), 148, and all base station transceivers 20 in the communication system 5 (only one base station 20 is shown in FIG. 14 for simplicity). Base station controller 15 coordinates the communication between remote stations in the communication system and other users connected to packet network interface 146 and PSTN 148. PSTN 148 interfaces with users through a standard telephone network (not shown).

Base station controller 15 contains many selector elements 136, although only one is shown in FIG. 14 for simplicity. Each selector element 136 is assigned to control communication between one or more base stations 20 and one remote station 40 (not shown). If selector element 136 has not been assigned to a given remote station 40, call control processor 141 is informed of the need to page the remote station 40. Call control processor 141 then directs base station 20 to page the remote station 40.

Data source 122 contains a quantity of data, which is to be transmitted to a given remote station 40. Data source 122 provides the data to packet network interface 146. Packet network interface 146 receives the data and routes the data to the selector element 136. Selector element 136 then transmits the data to each base station 20 in communication with the target remote station. In the exemplary embodiment, each base station 20 maintains a data queue 172, which stores the data to be transmitted to the remote station 40.

The data is transmitted in data packets from data queue 172 to channel element 168. In the exemplary embodiment, on the forward link, a "data packet" refers to a quantity of data which is a maximum of 1024 bits and a quantity of data to be transmitted to a destination remote station within a predetermined "time slot" (such as ≈1.667 msec). For each data packet, channel element 168 inserts the control fields. In the exemplary embodiment, channel element 168 performs a Cyclic Redundancy Check, CRC, encoding of the data packet and control fields and inserts a set of code tail bits. The data packet, control fields, CRC parity bits, and code tail bits comprise a formatted packet. In the exemplary embodiment, channel element 168 then encodes the formatted packet and interleaves (or reorders) the symbols within the encoded packet. In the exemplary embodiment, the interleaved packet is covered with a Walsh code, and spread with the short PNI and PNQ codes. The spread data is provided to RF unit 170 which quadrature modulates, filters, and amplifies the signal. The forward link signal is transmitted over the air through an antenna to the forward link.

At the remote station 40, the forward link signal is received by an antenna and routed to a receiver. The receiver filters, amplifies, quadrature demodulates, and quantizes the signal. The digitized signal is provided to a demodulator (DEMOD) where it is despread with the short PNI and PNQ codes and decovered with the Walsh cover. The demodulated data is provided to a decoder which performs the inverse of the signal processing functions done at base station 20, specifically the de-interleaving, decoding, and CRC check functions. The decoded data is provided to a data sink.

The DRC signal transmitted by each remote station 40 travels through a reverse link channel and is received at base station 20 through a receive antenna 173 coupled to RF unit 170. In the exemplary embodiment, the DRC information is demodulated in channel element 168 and provided to a channel scheduler 174 located in the base station controller 15 or to a channel scheduler 132 located in the base station 20. In one embodiment, the channel scheduler 174 is located in the base station 20. In an alternate embodiment, the channel scheduler 132 is located in the base station controller 15, and connects to all selector elements 136 within the base station controller 15.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), electrically programmable ROM (EPROM), electrically erasable programmable ROM (EEPROM), registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A radio access network element, comprising:
    a processor; and
    a memory coupled to said processor, whereby said memory comprising instructions executable by said processor for discovery of at least one other element in said radio access network, configured to:
    send a message to an address;
    establish a discovery session with said at least one other element;
    determine data and protocols supported by said at least one other element;
    retrieve said data; and
    use said protocols.

2. The radio access network element according to claim 1, wherein said radio access network element is a transceiver, said at least one other element is a transceiver, and wherein said message is an advertise message sent to said radio access network element.

3. The radio access network element according to claim 1, wherein said radio access network element is a controller, said at least one other element is a transceiver, and wherein said message is an advertise message sent to said radio access network element.

4. The radio access network element according to claim 1, wherein said radio access network element is a controller, said at least one other element is a controller, and wherein said message is an advertise message sent to said radio access network element.

5. The radio access network element according to claim 2, 3 or 4, further comprising a means for sending a solicit message to said at least one other element.

6. The radio access network element according to claim 2, 3 or 4, wherein said advertise message is sent to a multicast address.

7. The radio access network element according to claim 2, 3 or 4,
    wherein said advertise message is sent to a unicast address.

8. A radio access network element, comprising:
    a processor; and
    a memory coupled to said processor, whereby said memory comprising instructions executable by said processor for discovery of at least one other element in said radio access network, configured to:
    send an access channel message to a first transceiver;
    build an advertisement message;
    forward said access channel message and said advertisement message to a controller;
    establish a discovery session between said controller and said transceiver;
    assess said transceiver's capabilities; and
    acknowledge said access channel message.

9. The radio access network element according to claim 8, wherein said access channel message and said discovery advertisement message are forwarded to said controller using a mobile session address.

10. The radio access network element according to claim 8, wherein said processor and said memory being further configured to:
    request said transceiver for its preferred controller list; and
    transfer control of said discovery session to another controller on said preferred controller list.

11. The radio access network element according to claim 8, wherein said forwarding said access channel message and said discovery advertisement message to a controller instruction further comprises encapsulating both said access channel message and said advertisement message.

12. The radio access network element according to claim 10, wherein said processor and said memory being further configured to:
    send at least one solicit message to said another controller thereby allowing said controller responding with at least one advertisement message; and
    establish a discovery session between said controller and said another controller.

13. The radio access network element according to claim 11, wherein said advertisement message, is a discovery advertisement message and both said access channel message and said advertisement message are encapsulated using a generic encapsulation protocol.

14. A radio access network element, comprising:
a processor; and
a memory coupled to said processor, wherein said memory comprising instructions executable by said processor for discovery of at least one other element in said radio access network and removal or addition of network elements, configured to:
inform an added element to add at least one new element to its neighbor list:
discover information about said added element;
detect neighboring elements;
establish discovery sessions with said neighboring elements;
gather information from said neighboring elements; and
transmit said information to access terminals in overhead messages.

15. The radio access network element according to claim 14, wherein said processor and said memory being further configured to transmit said information to access terminals in overhead messages instruction is performed by a neighbor list manager.

16. A radio access element operable to detect the presence of at least one other element, comprising:
means for sending a message to an address;
means for establishing a discovery session with said at least one other element;
means for determining data and protocols supported by said at least one other element;
means for retrieving said data; and
means for using said protocols.

17. The radio access element according, to claim 16, wherein said radio access network element means is a first transceiver, said at least one other element is a second transceiver, and wherein said message is an advertise message sent to said first transceiver.

18. The radio access element according to claim 16, wherein said radio access network element means is a controller, said at least one other element is a transceiver, and wherein said message is an advertise message sent to said controller.

19. The radio access element according to claim 16, wherein said radio access network element means is a first controller, said at least one other element is a second controller, and wherein said message is an advertise message sent to said first controller.

20. The radio access element according to claim 17, 18 or 19, further comprising a means for sending a solicit message to said at least one other element.

21. The radio access element according to claim 17, 18 or 19, wherein said advertise message is sent to a multicast address.

22. The radio access element according to claim 17, 18 or 19, wherein said advertise message is sent to a unicast address.

23. A method of discovering at least one other element by a radio access network element, comprising:
sending a message to an address;
establishing a discovery session with said at least one other element;
determining data and protocols supported by said at least one other element;
retrieving said data; and
using said protocols.

24. The method of discovering at least one other element in a radio access network according to claim 23, wherein said step of detecting the presence of at least one other element is performed by a first transceiver, said at least one other element is a second transceiver, and wherein said message is an advertise message sent to said first transceiver.

25. The method of discovering at least one other element in a radio access network according to claim 23, wherein said step of detecting the presence of at least one other element is performed by a controller, said at least one other element is a transceiver, and wherein said message is an advertise message sent to said controller.

26. The method of discovering at least one other element in a radio access network according to claim 23, wherein said radio access network element means is a first controller, said at least one other element is a second controller, and wherein said message is an advertise message sent to said first controller.

27. The method of discovering of at least one other element in a radio access network according to claim 24, 25 or 26, further comprising sending a solicit message to said at least one other element.

28. The method of discovering of at least one other element in a radio access network according to claim 24, 25 or 26, wherein said advertise message is sent to a multicast address.

29. The method of discovering of at least one other element in a radio access network according to claim 24, 25 or 26, wherein said advertise message is sent to a unicast address.

30. A method of discovering at least one other element by a radio access network element, comprising:
forwarding messages from a mobile to a controller in another domain, comprising:
sending an access channel message to a first transceiver;
building an advertisement message;
forwarding said access channel message and said discovery advertisement message to a controller;
establishing, a discovery session between said controller and said transceiver that forwarded said access channel message;
assessing said transceiver's capabilities; and
acknowledging said access channel message.

31. The method of discovering of at least one other element in a radio access network according to claim 30, wherein said access channel message and said discovery advertisement message are forwarded to said controller using a mobile session address.

32. The method of discovering of at least one other element in a radio access network according to claim 30, wherein said step of forwarding messages from a mobile to a controller in another domain further comprises:
requesting said transceiver for its preferred controller list; and
transferring control of said radio session to another controller on said preferred controller list.

33. The method of discovering of at least one other element in a radio access network according to claim 30, wherein said step of forwarding said access channel message and said discovery advertisement message to a controller further comprises encapsulating both said access channel message and said advertisement message.

34. The method of discovering of at least one other element in a radio access network according to claim 32, wherein said step of transferring control of said radio session to another controller on said preferred controller list comprises:
sending at least one solicit message to said another controller;

said controller responding with at least one advertisement message; and establishing a discovery session between said controller and said another controller.

35. The method of discovering of at least one other element in a radio access network according to claim 33, wherein said advertisement message is a discovery advertisement message and both said access channel message and said advertisement message are encapsulated using a generic encapsulation protocol.

36. A radio access element operable to detect the presence of at least one other element, comprising:
means for sending an access channel message to a first transceiver;
means for building an advertisement message;
means for forwarding said access channel message and said discovery advertisement message to a controller;
means for establishing a discovery session between said controller and said transceiver that forwarded said access channel message;
means, for assessing said transceiver's capabilities; and
means for acknowledging said access, channel message.

37. The radio access element according to claim 36, wherein said access channel message and said discovery advertisement message are forwarded to said controller using a mobile session address.

38. The radio access element according to claim 37, wherein said means for transferring control of said radio session to another controller on said preferred controller list comprises:
means for sending at least one solicit message to said another controller;
means for said controller responding with at least one advertisement message; and
means for establishing a discovery session between said controller and said another controller.

39. The radio access element according to claim 36, wherein said means for forwarding messages from a mobile to a controller in another domain further comprises:
means for requesting said transceiver for its preferred controller list; and
means for transferring control of said radio session to another controller on said preferred controller list.

40. The radio access element according to claim 39, wherein said advertisement message is a discovery advertisement, message and both said access channel message and said advertisement message are encapsulated using a generic encapsulation protocol.

41. The radio access element according to claim 36, wherein said means for forwarding said access channel message and said discovery advertisement message to a controller further comprises means for encapsulating both said access channel message and said advertisement message.

42. The radio access element according to claim 36, wherein said means for transmitting said information to access terminals in overhead messages is performed by a neighbor list manager.

43. A radio access element operable to detect the presence of at least one other element, comprising:
means for informing neighboring elements to added at said least one new element to their neighbor list;
means for discovering information about said, added at least one element using discovery instructions;
means for detecting neighboring elements;
means for establishing discovery sessions with said neighboring elements;
means for gathering information from said neighboring elements; and
means for transmitting said information to access terminals in overhead messages.

44. A radio access element operable to detect the presence of at least one other element, comprising:
means for informing neighboring elements to add at said least one new element to their neighbor list;
means for discovering information about said added at least one element using discovery instructions;
means for determining a paging area, comprising:
means for using a neighbor list of at least one element to discover other elements; and
means for recursively building a paging area centered at said at least one element; and
means for forwarding messages from a mobile to a controller in another domain, comprising:
means for sending an access channel message to a first transceiver;
means for building an advertisement message;
means for forwarding said access channel message and said discovery advertisement message to a controller;
means for establishing a discovery session between said controller and said transceiver that forwarded said access channel message;
means for assessing said transceiver's capabilities; and
means for acknowledging said access channel message.

45. A radio access element operable to detect the presence of at least one other element, comprising:
means for informing neighboring elements to add at said least one new element to their neighbor list; and
means for discovering information about said added at least one element using discovery instructions;
wherein said means for informing the neighboring elements comprising:
means for checking if there is a session with said at least one new element;
means for requesting a session with said at least one new element if said first element does not have a session with said at least one element;
means for retrieving publisher information for said at least one new element;
means for sending at least one solicit message to said at least one new element;
means for responding with an advertise message that contains said publisher information;
means for retrieving publisher information for said at least one new element; and
means for resolving capabilities of said at least new element, comprising:
means for sending a message to an address;
means for establishing a discovery session with said at least one other element;
means for determining data and protocols supported by said at least one other element;
means for retrieving said data; and
means for using said protocols.

46. A radio access element operable to detect the presence of at least one other element, comprising:
means for using a neighbor list of at least one element to discover other elements; and
means for recursively building a paging area centered at said at least one element, comprising:
means for checking if there is a session with said second element;
means for requesting a session with said second element if a session with said second element does not exist;

means for sending at least one solicit message to said second element;
means for responding with an advertise message that contains said publisher information; and
means for retrieving publisher information for said at least one neighboring element;
means for resolving capabilities of said second element, comprising:
    means for sending a message to an address;
    means for establishing a discovery session with said at least one other element;
    means for determining data and protocols supported by said at least one other element;
    means for retrieving said data; and
    means for using said protocols.

47. The radio access element according to claim 46, wherein said means for recursively building a paging area centered at said at least one element further comprises:
    means for registering for event notifications that indicate changes to said neighbor list of said second element; and
    means for discovering additional elements contained in said second element's neighbor list.

48. The radio access element according to claim 46, wherein said means for recursively building a paging area centered at said at least one element further comprises:
    means for notifying said controller of a new element on said neighbor list of said at least one element;
    means for sending an update of said neighbor list of said at least one element to said controller; and
    means for discovering said new element.

49. A radio access network element, comprising:
    a processor; and
    a memory coupled to said processor, wherein said memory comprising instructions executable by said processor for discovery of at least one other element in said radio access network, configured to:
        remove or add network elements;
        determine a paging area;
        forward messages from a mobile unit to a controller in another domain;
        using use a neighbor list of said at least one other element to discover other elements,
        recursively build a paging area centered at said at least one other element;
        send an access channel message to a first transceiver;
        build an advertisement message;
        forward said access channel message and said discovery advertisement message to a controller;
        establish a discovery session between said controller and said transceiver;
        assess said transceiver's capabilities; and
        acknowledge said access channel message.

* * * * *

UNITED STATES PATENT AND TRADEMARK OFFICE
CERTIFICATE OF CORRECTION

PATENT NO. : 7,633,897 B2
APPLICATION NO. : 11/346978
DATED : December 15, 2009
INVENTOR(S) : Bender et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 947 days.

Signed and Sealed this

Twenty-first Day of December, 2010

David J. Kappos
*Director of the United States Patent and Trademark Office*